(12) United States Patent
Lee

(10) Patent No.: US 9,130,908 B2
(45) Date of Patent: Sep. 8, 2015

(54) TRANSMITTING DEVICE, RECEIVING DEVICE, AND OPERATION METHOD THEREOF

(75) Inventor: Gyumin Lee, Yongin-si (KR)

(73) Assignee: SK TELECOM CO., LTD., Seoul (KR)

(*) Notice: Subject to any disclaimer, the term of this patent is extended or adjusted under 35 U.S.C. 154(b) by 137 days.

(21) Appl. No.: 13/549,042

(22) Filed: Jul. 13, 2012

(65) Prior Publication Data

US 2013/0022043 A1 Jan. 24, 2013

(30) Foreign Application Priority Data

Jul. 19, 2011 (KR) .................. 10-2011-0071477

(51) Int. Cl.
*H04L 29/06* (2006.01)
*H04L 12/707* (2013.01)

(52) U.S. Cl.
CPC ............ *H04L 63/0428* (2013.01); *H04L 45/24* (2013.01)

(58) Field of Classification Search
CPC ................................ H04L 63/18; H04L 12/66
USPC ................... 370/351, 389; 713/150, 164–165
See application file for complete search history.

(56) References Cited

U.S. PATENT DOCUMENTS

| 7,869,429 | B2 * | 1/2011 | Toyomura et al. | 370/389 |
| 2004/0193878 | A1 * | 9/2004 | Dillinger et al. | 713/165 |
| 2007/0002748 | A1 * | 1/2007 | Nakata et al. | 370/238 |
| 2009/0094680 | A1 * | 4/2009 | Gupta et al. | 726/3 |

FOREIGN PATENT DOCUMENTS

| CN | 101087252 A | 12/2007 |
| CN | 101136857 A | 3/2008 |

OTHER PUBLICATIONS

Korean Office Action for application No. 10-2011-0071477 dated Feb. 25, 2014.
Chinese Office Action for application No. 201210250427.8 dated Nov. 15, 2014.

* cited by examiner

*Primary Examiner* — Siming Liu
(74) *Attorney, Agent, or Firm* — Lowe Hauptman & Ham, LLP

(57) ABSTRACT

In a transmitting device, a receiving device, and an operation method thereof according to the present invention, in relation to a simultaneous link transmission of divided data through a plurality of heterogeneous networks for one session, particular partial data to be transmitted or received through a network vulnerable to a security problem among divided partial data is forcedly divided and is then transmitted through two or more networks or a partial data packet included in particular partial data is forcedly re-divided and is then transmitted through two or more networks, so as to effectively conceal the service and thereby prevent other people or another party from recognizing the service through copying or intercepting of data packets.

15 Claims, 6 Drawing Sheets

TRANSMITTING DEVICE, RECEIVING DEVICE, AND OPERATION METHOD THEREOF

CROSS REFERENCE TO RELATED APPLICATION

This application claims the priority of Korean Patent Application No. 10-2011-0071477 filed on Jul. 19, 2011 in KIPO (Korean Intellectual Property Office), the disclosure of which is incorporated herein in their entirety by reference.

BACKGROUND

1. Technical Field

The present disclosure relates to simultaneous data transmission system and method thereof based on heterogeneous network, and more particularly to a transmitting device, a receiving device, and an operation method thereof, which can guarantee the security of data transmitted or received through heterogeneous networks in simultaneous data transmission environment where data can be transmitted or received through multi-link on heterogeneous networks simultaneously.

2. Description of the Related Art

Recently, it is common that communication service providers provide various services based on various wireless communication technologies. The service providers have provided services based on WLAN (ex. WiFi) related a short range wireless network, as well as the WCDMA, CDMA, and WiBro. Moreover, they employ a Long Term Evolution (LTE) technology, positively.

In a heterogeneous networks environment including various networks mixed therein as described above, it is conventional scheme for providing data service with a terminal device that the terminal device selects access network for data service among heterogeneous networks. Therefore it can be said that the conventional scheme is not preferable for the service provider because the service provider has limitation on the controllability of the selection of access network.

Meanwhile, these days, various wireless devices, such as a smart phone and a tablet PC, has been developed. In addition, a charge for data service decreased, and simultaneously data service using a large amount of data traffic increased. In such circumstances, the load on the networks of the service providers rapidly increases, thereby requiring excessive expense for network investment and threatening the service stability.

Accordingly, there is a need for a new service scheme for actively selecting an access network in a heterogeneous network environment according to the network state and achieving an efficient data transmission using the selected network.

SUMMARY

An aspect of the present invention seeks to strengthen the security of data to be transmitted or received through a network vulnerable to a security problem in simultaneous data transmission environment where data is transmitted or received through multi-link on heterogeneous networks simultaneously.

In accordance with an aspect of the present invention, there is provided a transmitting device comprises a multi-communication unit configured to support two or more network interfaces corresponding to each of two or more networks; a data dividing unit configured to, when it is necessary to forcedly divide particular data to be transmitted based on a predetermined criteria, forcedly divide the particular data into two or more partial data packets; and a data providing unit configured to provide first partial data packet corresponding to one part of the two or more partial data packets and second partial data packet corresponding to another part of the two or more partial data packets through the multi-communication unit.

When the particular data or at least one external device receiving the particular data corresponds to a predefined particular security condition, the data dividing unit is configured to forcedly divide the particular data into the two or more partial data packets.

In accordance with an aspect of the present invention, there is provided a transmitting device comprises a multi-communication unit configured to support two or more network interfaces corresponding to each of two or more networks; a data dividing unit configured to divide particular data to be transmitted into two or more partial data; a packet dividing unit configured to, when it is necessary to forcedly divide a particular partial data among the two or more partial data according to a predetermined criteria, re-divide at least one data packet included in the particular partial data into two or more partial data packets; and a data providing unit configured to provide first partial data packet corresponding to one part of the re-divided two or more partial data packets and second partial data packet corresponding to another part of the re-divided two or more partial data packets through the multi-communication unit.

When the particular partial data or an external device receiving the particular partial data corresponds to a predefined particular security condition, the packet dividing unit may be configured to forcedly re-divide the at least one data packet included in the particular partial data into the two or more partial data packets.

In accordance with an aspect of the present invention, there is provided a receiving device comprises a multi-communication unit configured to support two or more network interfaces corresponding to each of two or more networks and, when it is necessary to forcedly divide a particular partial data among two or more partial data divided from data to be transmitted according to a predetermined criteria, receive two or more partial data packets generated by re-dividing a particular data packet among one or more data packets included in the particular partial data; and a packet merging unit configured to merge first partial data packet corresponding to one part of the two or more partial data packets and second partial data packet corresponding to another part of the two or more partial data packets.

The packet merging unit may be configured to merge the first partial data packet and the second partial data packet based on at least one of network access information, packet identification information, and packet sequence information included in each of the first partial data packet or the second partial data packet.

The packet merging unit may be configured to extract the first partial data packet and the second partial data packet including particular network access information of a particular transmitting device, and merge the first partial data packet and the second partial data packet based on at least one of the packet identification information and the packet sequence information included in the extracted first partial data packet and the extracted second partial data packet.

In accordance with an aspect of the present invention, there is provided an operation method of a transmitting device, the operation method comprises dividing particular data to be transmitted into two or more partial data; re-dividing, when it is necessary to forcedly divide a particular partial data among the two or more partial data according to a predetermined criteria, at least one data packet included in the particular partial data into two or more partial data packets; and transmitting first partial data packet corresponding to one part of the two or more partial data packets through a first network among the two or more networks and transmitting second partial data packet corresponding to another part of the two or more partial data packets through a second network among the two or more networks.

The step of re-dividing of the at least one data packet may comprise, when the particular partial data or an external device receiving the particular partial data corresponds to a predefined particular security condition, forcedly re-dividing the at least one data packet into the two or more partial data packets.

In accordance with an aspect of the present invention, there is provided an operation method of a receiving device, the operation method comprising: receiving, when it is necessary to forcedly divide a particular partial data among two or more partial data divided from data to be transmitted according to a predetermined criteria, two or more partial data packets generated by re-dividing a particular data packet among one or more data packets included in the particular partial data; identifying first partial data packet corresponding to one part of the two or more partial data packets and a second partial data packet corresponding to another part of the two or more partial data packets; generating the particular data packet by merging the first partial data packet and the second partial data packet; and generating the particular partial data by using the generated particular data packet.

In a transmitting device, a receiving device, and an operation method thereof according to an aspect of the present invention, particular partial data to be transmitted or received through a network vulnerable to a security problem is forcedly divided and is then transmitted through two or more networks or a partial data packet included in particular partial data is forcedly re-divided and is then transmitted through two or more networks. Therefore the data service related to the partial data or the partial data packet may be effectively concealed even though the partial data or the partial data packet is copied or intercepted.

BRIEF DESCRIPTION OF THE DRAWINGS

The above and other objects, features and advantages of some embodiments of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings.

Figure 1:
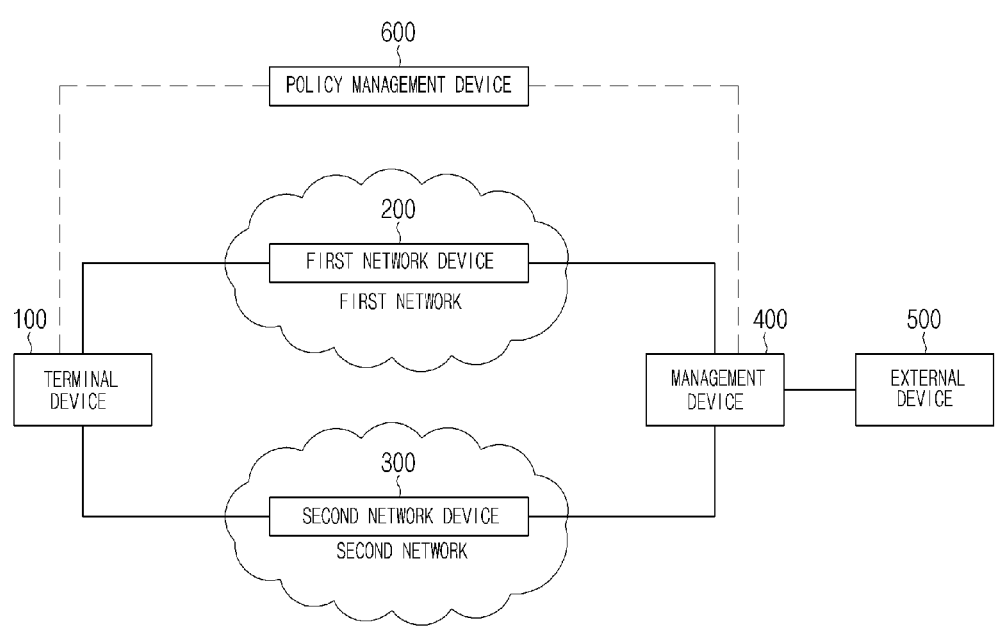
FIG. 1 is a block diagram illustrating a simultaneous data transmission system based on heterogeneous network according to an exemplary embodiment of the present invention.

FIG. 1 is a block diagram illustrating a simultaneous data transmission system based on heterogeneous network according to an exemplary embodiment of the present invention.

Referring to FIG. 1, the simultaneous data transmission system based on heterogeneous network includes a terminal device 100, a first network device 200, a second network device 300, and a management device 400.

Among the terminal device 100 and the management device 400, the terminal device 100 may correspond to a transmitting device in the uplink procedure of the data service while the management device 400 may correspond to a transmitting device in the downlink procedure of the data service.

First, the first embodiment of the present invention will be described hereinafter by describing the downlink procedure with reference to FIG. 1. In the simultaneous data transmission system based on heterogeneous network according to an exemplary embodiment of the present invention, when it is necessary to forcedly divide particular data to be transmitted according to a predetermined criteria, the management device 400, which functions as a transmitting device, forcedly divides the particular data into two or more partial data packets and then transmits first partial data packet corresponding to a part of the two or more partial data packets and second partial data packet corresponding to another part of the two or more partial data packets to at least one corresponding particular network among two or more networks (e.g. 3G network, WiFi network, LTE network, WiBro network, etc.), respectively. Further, the first network device 200 receives the first partial data packet from the management device 400 and the second network device 300 receives the second partial data packet from the management device 400. In addition, the terminal device 100, which functions as a receiving device, receives the first partial data packet from the first network device 200, receives the second partial data packet from the second network device 300, and merges the first partial data packet and the second partial data packet to generate the original data packet.

Now, the second embodiment of the present invention will be described by describing the uplink procedure with reference to FIG. 1. In the simultaneous data transmission system based on heterogeneous network, the terminal device 100, which functions as a transmitting device, divides at least one data packet included in particular data to be transmitted into two or more partial data packets and then transmits a first partial data packet corresponding to a part of the two or more partial data packets and a second partial data packet corresponding to another part of the two or more partial data packets to at least one corresponding particular network among two or more networks (e.g. 3G network, WiFi network, LTE network, WiBro network, etc.), respectively. Further, the first network device 200 receives the first partial data packet from the terminal device 100 and the second network device 300 receives the second partial data packet from the terminal device 100. In addition, the management device 400, which functions as a receiving device, receives the first partial data packet from the first network device 200, receives the second partial data packet from the second network device 300, and merges the first partial data packet and the second partial data packet to generate the original data packet.

In more detail, the terminal device 100 may divide the particular data to be transmitted into two or more partial data, divide at least one data packet included in a particular partial data into two or more partial data packets, transmit a partial data not being divided to at least one corresponding particular network among two or more networks (e.g. 3G network, WiFi network, LTE network, WiBro network, etc.), transmit first partial data packet corresponding to a part of the two or more partial data packets to one network among the two or more networks (e.g. 3G network, WiFi network, LTE network, WiBro network, etc.), and transmit a second partial data packet corresponding to the another part of the two or more partial data packets to another network among the two or more networks (e.g. 3G network, WiFi network, LTE network, WiBro network, etc.).

Also, the simultaneous data transmission system based on heterogeneous network further includes an external device 500 which receives merged data from the management device 400 and a policy management device 600 which provides a network selection policy.

A simultaneous data transmission service includes configuration which divides data to be transmitted and received between the terminal device 100 and the external device 500 and performs the data transmission and reception using a plurality of heterogeneous networks (e.g. 3G network, WiFi network, etc.).

Therefore, in order to implement a simultaneous link transmission in heterogeneous networks, the management device 400 performs the session division. In this event, since the terminal device 100 is connected to each of the plurality of heterogeneous networks (e.g. 3G network, WiFi network, etc.), the management device 400 should recognize respective simultaneous links through a plurality of heterogeneous networks as links of a single terminal device 100 and manage them with only one subject, i.e. a single terminal device 100. To this end, it is required to allocate/manage separate network access information (e.g. virtual IP address) for a simultaneous transmission service in accordance with the terminal device 100.

Here, the present invention guarantees the transparency of Layer 3 in implementing the simultaneous link transmission through a plurality of heterogeneous networks for one session. This implies that there is a possibility of occurrence of a situation in which a data service used by the terminal device 100 may be identified by another party through copying or intercepting of data packets. Especially, a WiFi network including an Internet network may be vulnerable to this situation.

Therefore, in implementing a simultaneous link transmission through a plurality of heterogeneous networks for one session, it is required to conceal the data service in order to prevent other people or another party from recognizing the service through copying or intercepting of data packets.

The external device 500 refers to a service device which transmits or receives data to or from the terminal device 100 through the management device 400. The external device 500 can provide various services, such as a portal service and a contents providing service, to the terminal device 100 through data transmission and reception.

Further, the policy management device 600 determines a network selection policy and provides the determined network selection policy to the terminal device 100 and the management device 400, based on network state information received from the terminal device 100 and the management device 400 according to the network state change and various network parameters of heterogeneous networks, including subscriber preference, subscriber type, charging system, and types service applications to be provided.

The heterogeneous networks may correspond to various access networks including, for example, a WCDMA network, a CDMA network, a WiBro network, a WLAN (WiFi) network, and a Long Term Evolution (LTE) network. However, for convenience, the description of the present embodiment is limited to a first network (hereinafter, referred to also as "3G network") corresponding to a wireless packet service network (WCDMA) and a second network (hereinafter, referred to also as "WiFi network") corresponding to a short range wireless network (WiFi).

As a result, the first network device 200 may be a GGSN (Gateway GPRS Support Node) in 3G network (a mobile packet service network) system, and the second network device 300 may be an Access Point (AP) for a WiFi network, that is, a short range wireless network.

Figure 2:
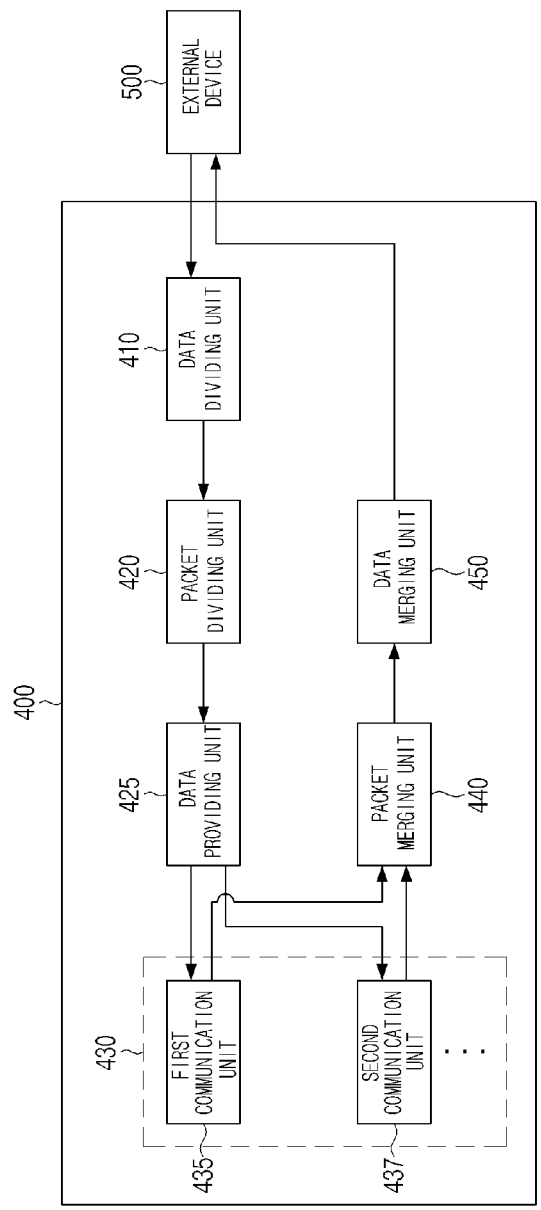
FIG. 2 is a block diagram illustrating a management device functioning as a transmitting device or a receiving device according to an exemplary embodiment of the present invention.

Hereinafter, the configuration of the management device 400 as a transmitting device will be described in more detail in consideration of a downlink procedure with reference to FIG. 2.

The management device 400 as a transmitting device includes a multi-communication unit 430 supporting two or more network interfaces corresponding to two or more networks, a data dividing unit 410 for, when it is necessary to forcedly divide particular data to be transmitted according to a predetermined criteria, forcedly dividing the particular data into two or more partial data packets, and a data providing unit 425 for providing a first partial data packet corresponding to a part of the two or more partial data packets and a second partial data packet corresponding to another part of the two or more partial data packets to the multi-communication unit 430.

The multi-communication unit 430 corresponds to a functional communication unit supporting two or more network interfaces through two or more networks different from each other. As an example of the two different networks, the multi-communication unit 430 may include a first communication unit 435 supporting a first network and a second communication unit 437 supporting a second network.

The first communication unit 435 may be a communication module supporting a first network interface through the first network for transmission and reception of data. For example, the first communication unit 435 may be a communication module for interworking with the first network device 200 through a 3G network.

The second communication unit 437 may be a communication module supporting a second network interface through the second network for transmission and reception of data. For example, the second communication unit 437 may be a communication module for interworking with the second network device 300 through a WiFi network.

The data dividing unit 410 forcedly divides particular data to be transmitted into two or more partial data packets when it is necessary to forcedly divide the particular data according to a predetermined criteria.

In more detail, for data transmission and reception with the terminal device 100, the data dividing unit 410 may receive particular data, which is requested to be transmitted to the terminal device 100, from a particular external device 500 providing a data service. Then, when it is determined that it is necessary to forcedly divide the particular data according to a predetermined criteria, the data dividing unit 410 forcedly divides the particular data into two or more partial data packets.

In other words, when a predefined particular security condition is satisfied with respect to the kind of the data to be transmitted or the kind of the particular external device, the data dividing unit 410 may forcedly divide the particular data into two or more partial data packets.

That is, the data dividing unit 410 may predefine a condition in which the kind of the data to be transmitted corresponds to data regarding an electronic transaction related data service (e.g. services of Internet banking, card payment system, security grade subscriber log-in, etc.) as a security condition. Also, the data dividing unit 410 may predefine a condition in which the kind of the external device 500 corresponds to a server of a governmental organization (e.g. national assembly, national tax service, etc.), as a security condition.

When it is not in such a predefined particular security condition, the data dividing unit 410 does not perform the forced packet division of the data. Only in a security condition, the data dividing unit 410 forcedly divides the particular data into two or more partial data packets.

In addition, the data dividing unit 410 inserts particular network access information in the forcedly divided two or more partial data packets.

For example, the data dividing unit 410 may possess subscriber-specific table information including network access information (for example, a virtual IP address) of a device registered for simultaneous data transmission service for each subscriber, and may possess network access information (for example, a virtual IP address) of the management device 400 for a heterogeneous network based simultaneous data transmission service.

In more detail, the management device 400 may possess subscriber-specific table information as described above, which includes, for example, first network and second network access information (for example, 3G IP and WiFi IP) mapped based on device identification information (for example, IMSI) of a terminal device, separate special network access information (for example, a virtual IP address) and service classification information (including "initial", "update", and "remove"), and a network selection policy for traffic distribution in a heterogeneous network environment, such as information for traffic identification (including Source IP, Source Port, Destination IP, Destination Port, Protocol (UDP, TCP), etc.) and traffic distribution rates for a 3G network and a WiFi network.

As a result, when the particular data requested to be transmitted to the terminal device 100 from the external device 500 has been forcedly divided into two or more partial data packets, the data dividing unit 410 determines the networks and the traffic distribution rate for transmission of the forcedly divided two or more partial data packets based on distribution rates for each of networks changing according to a detected real time network state or the network selection policy transferred from the policy management device 600. This selection procedure may be performed by the data dividing unit 410 based on the network-specific traffic distribution rate changing according to a detected real time network state or the network selection policy transferred from the policy management device 600.

By performing the above-described selection procedure based on the network-specific distribution rate changing according to a detected real time network state or the network selection policy, the data dividing unit 410 may apply relative distribution ratios to the 3G network and the WiFi network, for example, a relative distribution ratio of 10% to the 3G network and a relative distribution ratio of 90% to the WiFi network, a relative distribution of 90% to the 3G network and a relative distribution ratio of 10% to the WiFi network, a relative distribution ratio of 50% to the 3G network and a relative distribution ratio of 50% to the WiFi network, a relative distribution ratio of 0% to the 3G network and a relative distribution ratio of 100% to the WiFi network, or a relative distribution ratio of 100% to the 3G network and a relative distribution ratio of 0% to the WiFi network.

In addition, the data dividing unit 410 inserts network access information (for example, virtual IP) of the management device 400 and/or the terminal device 100 recognized based on the possessed subscriber-specific table information, into the forcedly divided two or more partial data packets.

For example, the data dividing unit 410 may insert network access information (for example, virtual IP) of the terminal device 100 in order to indicate that the forcedly divided two or more partial data packets have been divided from one piece of data provided to the particular terminal device 100, as destination address information, and network access information (for example, virtual IP) of the management device 400, as source address information, into headers of the forcedly divided two or more partial data packets as described above.

The data providing unit 425 provides a first partial data packet corresponding to a part of the two or more partial data packets and a second partial data packet corresponding to another part of the two or more partial data packets to the multi-communication unit 430.

That is, the data providing unit 425 provides a first partial data packet among the two or more partial data packets forcedly divided by the data dividing unit 410 to the first communication unit 435 so as to transmit the first partial data packet to at least one corresponding particular network (e.g. 3G network) among the two or more networks (e.g. 3G network, WiFi network, LTE network, WiBro network, etc.), and provides a second partial data packet among the forcedly divided two or more partial data packets to the second communication unit 437 so as to transmit the second partial data packet to at least one corresponding particular network (e.g. WiFi network) among the two or more networks (e.g. 3G network, WiFi network, LTE network, WiBro network, etc.).

Accordingly, the first partial data packet transmitted through the first communication unit 435 is provided to the first network device 200 located in the 3G network, and the first network device 200 then transmits the first partial data packet to the terminal device 100 as a receiving device. Further, the second partial data packet transmitted through the second communication unit 437 is provided to the second network device 300 located in the WiFi network, and the second network device 300 then transmits the second partial data packet to the terminal device 100 as a receiving device.

As described above, when the data to be transmitted is vulnerable to the security problem or the management device 400 requires augmented security, the management device 400 forcedly divides the data to be transmitted into two or more partial data packets and transmits the divided partial data packets through heterogeneous networks, so as to reinforce the security for the data to be transmitted.

Hereinafter, the configuration of the management device 400 as a transmitting device according to the second embodiment of the present invention will be described in more detail in consideration of a downlink procedure with reference to FIG. 2. In the case of the second embodiment of the present invention, the management device 400 may further include a packet dividing unit 420 in addition to the configuration according to the first embodiment of the present invention.

That is to say, the management device 400 as a transmitting device according to an exemplary embodiment of the present invention includes a multi-communication unit 430 supporting two or more network interfaces through two or more networks, a data dividing unit 410 for forcedly dividing particular data to be transmitted into two or more partial data, a packet dividing unit 420 for dividing at least one data packet included in a particular partial data among the two or more partial data into two or more partial data packets, a data providing unit 425 for providing a partial data not being divided to the multi-communication unit 430 and providing a first partial data packet corresponding to a part of the divided two or more partial data packets and a second partial data packet corresponding to another part of the divided two or more partial data packets to the multi-communication unit 430.

The multi-communication unit 430 corresponds to the multi-communication unit 430 according to the first embodiment of the present invention, so a detailed description thereof is omitted her.

Meanwhile, the data dividing unit 410 divides the particular data to be transmitted into two or more partial data.

In more detail, for data transmission and reception with the terminal device 100, the data dividing unit 410 may receive particular data, which is requested to be transmitted to the terminal device 100, from a particular external device 500 providing a data service. Then, the data dividing unit 410 forcedly divides the particular data into two or more partial data and inserts particular network access information corresponding to the terminal device 100 in the two or more partial data.

For example, the data dividing unit 410 may possess subscriber-specific table information including network access information (for example, a virtual IP address) of a device for each subscriber in order to provide a heterogeneous network based simultaneous data transmission service according to an exemplary embodiment of the present invention, and network access information (for example, a virtual IP address) of the management device 400.

In more detail, the management device 400 may possess subscriber-specific table information as described above, which includes, for example, first network and second network access information (for example, 3G IP and WiFi IP) mapped based on device identification information (for example, IMSI) of a terminal device having a registered service for each subscriber, access information such as separate special network access information (for example, a virtual IP address) and service classification information (including "initial", "update", and "remove"), and a network selection policy for traffic distribution in a heterogeneous network environment, such as information (including Source IP, Source Port, Destination IP, Destination Port, Protocol (UDP, TCP), etc.) for traffic identification and traffic distribution rates for a 3G network and a WiFi network.

As a result, when the data dividing unit 410 has received particular data and a request for transmission of the particular data to the terminal device 100 from the external device 500, the data dividing unit 410 divides the particular data into two or more pieces of partial data. That is, for simultaneous data transmission using a 3G network and a WiFi network, the data dividing unit 410 divides the particular data to be transmitted into two or more pieces of partial data corresponding to the number of networks. This procedure of division may be performed based on the network-specific traffic distribution rate changing according to a detected real time network state or the network selection policy transferred from the policy management device 600.

By performing the above-described procedure of data division based on the network-specific distribution rate changing according to a detected real time network state or the network selection policy, the data dividing unit 410 may apply relative distribution ratios to the 3G network and the WiFi network, for example, a relative distribution ratio of 10% to the 3G network and a relative distribution ratio of 90% to the WiFi network, a relative distribution ratio of 90% to the 3G network and a relative distribution ratio of 10% to the WiFi network, a relative distribution ratio of 50% to the 3G network and a relative distribution ratio of 50% to the WiFi network, a relative distribution ratio of 0% to the 3G network and a relative distribution ratio of 100% to the WiFi network, or a relative distribution ratio of 100% to the 3G network and a relative distribution ratio of 0% to the WiFi network.

In addition, the data dividing unit 410 inserts network access information (for example, virtual IP) of the terminal device 100 and/or the management device 400 recognized based on the possessed subscriber-specific table information, into the two or more partial data packets.

For example, the data dividing unit 410 may insert network access information (for example, virtual IP) of the terminal device 100 in order to indicate that the divided two or more of partial data have been divided from one piece of data provided to the particular terminal device 100, as destination address information, and network access information (for example, virtual IP) of the management device 400, as source address information, into headers of each of the divided two or more pieces of partial data as described above.

The packet dividing unit 420 divides at least one data packet included in a particular partial data among the two or more partial data divided by the data dividing unit 410 into two or more partial data packets.

In more detail, in a predefined particular security condition requiring the security based on one or more combinations of the kind of the data to be transmitted and the kind of the particular external device which corresponds to a device for transmitting or receiving the data to be transmitted, the data dividing unit 410 may divide at least one data packet included in a particular piece of partial data among the two or more pieces of partial data into two or more partial data packets.

That is, the packet dividing unit 420 may predefine a situation in which the kind of the data to be transmitted corresponds to data according to an electronic transaction related data service (e.g. services of Internet banking, card payment system, security grade subscriber log-in, etc.) especially requiring the security, as a security condition. Also, the packet dividing unit 420 may predefine a situation in which the kind of the external device 500 for transmitting or receiving the data to be transmitted corresponds to a server of a governmental organization (e.g. national assembly, national tax service, etc.) especially requiring the security, as a security condition.

When it is not in such a predefined particular security condition, the packet dividing unit 420 does not perform the packet division of the two or more pieces of partial data divided by the data dividing unit 410. Only in a security condition, the packet dividing unit 420 divides at least one data packet included in a particular piece of partial data among the two or more pieces of partial data divided by the data dividing unit 410 into two or more partial data packets.

Moreover, the packet dividing unit 420 can divide at least one data packet included in the particular piece of partial data into two or more partial data packets as described above only when respective networks for transmitting two or more pieces of partial data divided from the particular data have been selected from the two or more networks and at least one of the selected respective networks does not satisfy a predefined security criteria.

In other words, when a 3G network and an LTE network satisfying a predefined security criteria have been selected as the respective networks for transmitting two or more pieces of partial data divided from the particular data among the two or more networks, the packet dividing unit 420 does not perform the packet division of the two or more pieces of partial data divided by the data dividing unit 410. In contrast, when a WiFi network which does not satisfy a predefined security criteria has been selected from the two or more networks, the packet dividing unit 420 divides at least one data packet included in a particular piece of partial data to be transmitted to the WiFi network among the two or more pieces of partial data divided by the data dividing unit 410 into two or more partial data packets.

Now, the process of dividing a data packet will be described in more detail. It is recommendable that the packet dividing unit 420 may possess a particular packet division policy which includes one or more combinations of network-specific packet distribution rates established in advance in consideration of states of two or more used networks and types of networks to which the packet division is applied.

For example, the packet dividing unit 420 may possess a particular packet division policy which includes one or more combinations of network-specific packet distribution rates established in advance in consideration of states of two or more used networks (for example, 3G network and WiFi network) and type information on a pre-established particular network (for example, WiFi network) to which the packet division is to be applied since the network is relatively vulnerable to the security problem.

It is recommendable that this packet division policy is updated by the policy management device 600 determining the network selection policy based on the network state information of two or more networks.

The packet dividing unit 420 already possessing the packet division policy as described above recognizes partial data corresponding to the type of the network (for example, WiFi network) to which the packet division is applied among the two or more pieces of partial data divided by the data dividing unit 410.

Further, the packet dividing unit 420 identifies a first packet distribution rate for transmission of data packets to the first network device 200 and a second packet distribution rate for transmission of data packets to the second network device 300 according to the network-specific packet distribution rates of the packet division policy, divides at least one data packet included in corresponding partial data recognized according to the WiFi network based on the identified packet distribution rates, and determines, for each data packet, a first partial data packet to be transmitted to the first network device 200 among the two or more networks and a second partial data packet to be transmitted to the second network device 300.

The data providing unit 425 provides partial data not being divided among the two or more pieces of partial data to the multi-communication unit 430 and provides a first partial data packet corresponding to a part of the two or more partial data packets and a second partial data packet corresponding to another part of the two or more partial data packets to the multi-communication unit 430.

That is, the data providing unit 425 provides partial data not being divided among the two or more pieces of partial data divided by the data dividing unit 410 to the first communication unit 435 so as to transmit the partial data not being divided to at least one corresponding particular network (e.g. 3G network) among the two or more networks (e.g. 3G network, WiFi network, LTE network, WiBro network, etc.).

Accordingly, the partial data transmitted through the first communication unit 435 is provided to the first network device 200 located in the 3G network, and the first network device 200 then transmits the partial data to the terminal device 100 functioning as a receiving device.

Further, the data providing unit 425 provides a first partial data packet divided by the packet dividing unit 420 among the two or more pieces of partial data divided by the data dividing unit 410 to the first communication unit 435 so as to transmit the first partial data packet to at least one corresponding particular network (e.g. 3G network) among the two or more networks (e.g. 3G network, WiFi network, LTE network, WiBro network, etc.), and provides a second partial data packet divided by the packet dividing unit 420 among the two or more pieces of partial data divided by the data dividing unit 410 to the second communication unit 437 so as to transmit the second partial data packet to at least one corresponding particular network (e.g. WiFi network) among the two or more networks (e.g. 3G network, WiFi network, LTE network, WiBro network, etc.).

Accordingly, the first partial data packet transmitted through the first communication unit 435 is provided to the first network device 200 located in the 3G network, and the first network device 200 then transmits the first partial data packet to the terminal device 100 functioning as a receiving device. Further, the second partial data packet transmitted through the second communication unit 437 is provided to the second network device 300 located in the WiFi network, and the second network device 300 then transmits the second partial data packet to the terminal device 100 functioning as a receiving device.

As described above, the management device 400 performs a first division for dividing a piece of data into two or more pieces of partial data, performs a second division for dividing a piece of particular partial data to be transmitted through a network vulnerable to the security problem among the divided two or more pieces of partial data into two or more partial data packets, and then transmits the respective divided partial data packets through heterogeneous networks, so as to reinforce the security for the data to be transmitted.

Hereinafter, the configuration of the management device 400 as a receiving device according to an exemplary embodiment of the present invention will be described in consideration of an uplink procedure.

The management device 400 as a receiving device according to the present invention may include a packet merging unit 440 and a data merging unit 450.

When a first data packet corresponding to a part of two or more partial data packets divided from one particular data packet and a second data packet corresponding to another part thereof have been received through the multi-communication unit 430, the packet merging unit 440 merges the first data packet and the second data packet based on one or more combinations of particular network access information and packet identification information, packet identification information, and packet sequence information included the first data packet and the second data packet, so as to reconstruct the original data packet.

In more detail, during the uplink procedure, the first partial data packet forcedly divided from one data packet by the terminal device 100 may be transferred through a 3G network to the management device 400 as a receiving device, and the forcedly divided second partial data packet may be transferred through a WiFi network to the management device 400 as a receiving device.

In this event, the first data packet corresponding to a part of two or more partial data packets divided from one particular data packet and the second data packet corresponding to another part thereof may be received through the multi-communication unit 430.

Also, when a first data packet corresponding to a part of two or more partial data packets divided from one particular data packet and a second data packet corresponding to another part thereof have been received through the multi-communication unit 430, the packet merging unit 440 may recognize the first data packet and the second data packet as packets having been provided by one particular terminal device 100, based on the subscriber-specific table information including network access information (for example, a virtual IP address) of a device having a registered service for each subscriber.

In other words, based on the subscriber-specific table information including network access information (for example, a virtual IP address) of a device having a registered service for each subscriber and based on the network access information (for example, a virtual IP address) included in the first partial data packet and the second partial data packet, the packet merging unit 440 extracts and recognizes the first partial data packet and the second partial data packet according to particular network access information (for example, a virtual IP address) corresponding to another particular transmitting device, i.e. the terminal device 100. This recognition corresponds to recognition of partial data packets divided from one piece of data provided by the terminal device 100.

Further, the packet merging unit 440 extracts and recognizes the first partial data packet and the second partial data packet having the same packet identification information based on the packet identification information included in the recognized first partial data packet and second partial data packet. This recognition corresponds to recognition of partial data packets divided from one particular data packet.

Further, the packet merging unit 440 may generate the original data packet by merging the first partial data packet and the second partial data packet according to a sequence based on the packet sequence information included in the recognized first partial data packet and second partial data packet, and may reconstruct the original partial data by merging the generated data packets.

When pieces of partial data divided from one piece of particular data have been received through the multi-communication unit 430, the data merging unit 450 generates the particular data by merging the pieces of partial data based on one or more combinations of data sequence information and particular network access information included in the partial data, indicating the sequence between multiple pieces of data including at least one data packet generated by the packet merging unit 440 and the received partial data.

During the uplink procedure, a piece of unpacketized partial data divided from one piece of data by the terminal device 100 may be transferred to the management device 400 as a receiving device through a 3G network.

Further, a piece of partial data corresponding to a part of two or more pieces of partial data divided from one piece of particular data may be received through the multi-communication unit 430.

Then, when a piece of partial data divided from one piece of particular data has been received through the multi-communication unit 430, the data merging unit 450 extracts and recognizes partial data having network access information (for example, a virtual IP address) corresponding to a particular terminal device 100 based on particular network access information (for example, a virtual IP address) included in partial data including one or more data packet generated/reconstructed by the packet merging unit 440 and the received partial data. This recognition corresponds to recognition of pieces of partial data divided from one piece of data provided by the terminal device 100.

Further, the data merging unit 450 may generate or reconstruct the original data by merging the pieces of partial data according to the data sequence information (for example, sequence number) included in each piece of the recognized partial data, or may transfer the reconstructed data to a corresponding external device 500.

Figure 3:
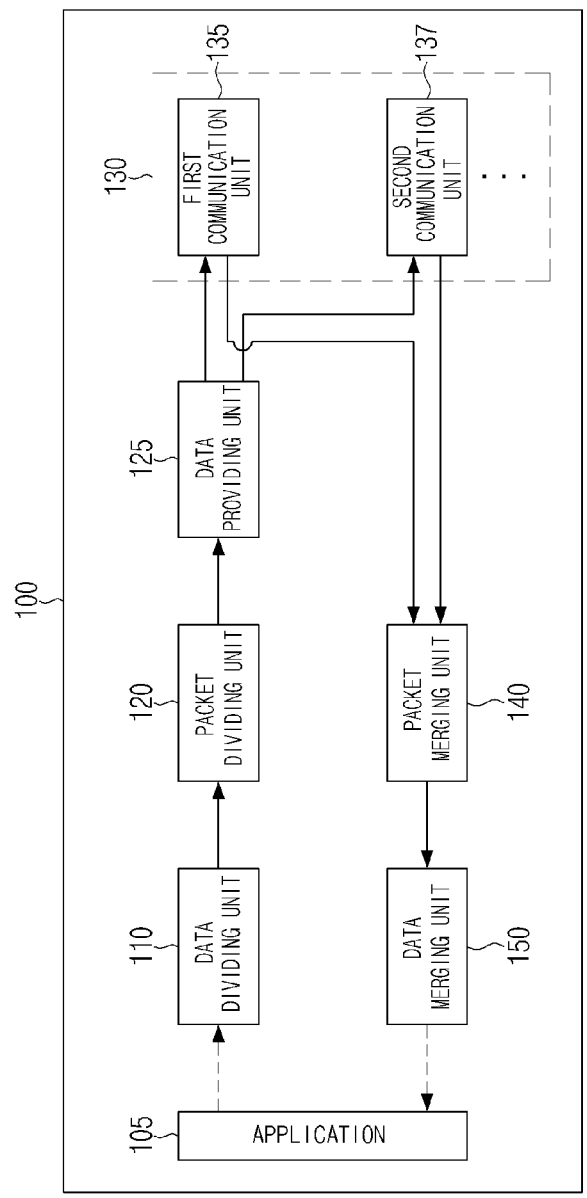
FIG. 3 is a block diagram illustrating a terminal device functioning as a transmitting device or a receiving device according to an exemplary embodiment of the present invention.

Hereinafter, the configuration of the terminal device 100 as a transmitting device according to the first embodiment of the present invention will be described in more detail in consideration of an uplink procedure with reference to FIG. 3.

The terminal device 100 as a transmitting device according to the present invention includes a multi-communication unit 130 supporting two or more network interfaces corresponding to two or more networks, a data dividing unit 110 for, when it is necessary to forcedly divide particular data to be transmitted according to a predetermined criteria, forcedly dividing the particular data into two or more partial data packets, and a data providing unit 125 for providing a first partial data packet corresponding to a part of the two or more partial data packets and a second partial data packet corresponding to another part of the two or more partial data packets to the multi-communication unit 130.

The multi-communication unit 130, the data dividing unit 110, and the data providing unit 125 correspond to the multi-communication unit 430, the data dividing unit 410, and the data providing unit 425 described above in relation to the downlink procedure according to the first embodiment of the present invention with reference to FIG. 1, so a detailed description thereof will be omitted here.

However, in order to insert particular network access information into the forcedly divided two or more partial data packets, the data dividing unit 110 may be allocated and possess separate network access information (for example, a virtual IP address) for a heterogeneous network based simultaneous data transmission service according the present invention.

When the data dividing unit 110 has received particular data, which is requested to be transmitted, from an inside application 105, the data dividing unit 110 forcedly divides the particular data to be transmitted into two or more partial data packets as described above and then determines the network and the traffic distribution rate for transmission of the forcedly divided two or more partial data packets based on the network-specific distribution rates changing according to a detected real time network state or the network selection policy transferred from the policy management device 600.

Thereafter, the data dividing unit 110 may insert network access information (for example, virtual IP) of the terminal device 100 in order to indicate that the forcedly divided two or more partial data packets have been divided from one piece of data provided by the particular terminal device 100 to which the data dividing unit 110 belongs, as source address information, into headers of the forcedly divided two or more partial data packets as described above.

As described above, when the data to be transmitted is vulnerable to the security problem or the terminal device 100 requires augmented security, the terminal device 100 forcedly divides the data to be transmitted into two or more partial data packets and transmits the divided partial data packets through heterogeneous networks, so as to reinforce the security for the data to be transmitted.

Hereinafter, the configuration of the terminal device 100 as a transmitting device according to the second embodiment of the present invention will be described in more detail in consideration of an uplink procedure with reference to FIG. 3. In the case of the second embodiment of the present invention, the terminal device 100 may further include a packet dividing unit 120 in addition to the configuration according to the first embodiment of the present invention.

That is to say, the terminal device 100 as a transmitting device according to the present invention includes a multi-communication unit 130 supporting two or more network interfaces through two or more networks, a data dividing unit 110 for forcedly dividing particular data to be transmitted into two or more pieces of partial data, a packet dividing unit 120 for dividing at least one data packet included in a particular piece of partial data among the two or more pieces of partial data into two or more partial data packets, a data providing unit 125 for providing a piece of unpacketized partial data among the two or more pieces of partial data to the multi-communication unit 130 and providing a first partial data packet corresponding to a part of the packetized two or more partial data packets and a second partial data packet corresponding to another part of the packetized two or more partial data packets to the multi-communication unit 130.

The multi-communication unit 130 may have a configuration corresponding to that of the multi-communication unit 430 of the management device 400 according to the second embodiment of the present invention described above.

The data dividing unit 110 divides the particular data to be transmitted into two or more pieces of partial data.

In more detail, the data dividing unit 110 may receive particular data to be transmitted from a particular inside application 105 using a data service executed within the terminal device 100. Then, the data dividing unit 110 forcedly divides the particular data into two or more pieces of partial data and inserts particular network access information in the two or more pieces of partial data.

For example, the data dividing unit 110 may be allocated and possess separate network access information (for example, a virtual IP address) for a heterogeneous network based simultaneous data transmission service according to the present invention.

As a result, when the data dividing unit 110 has received particular data and a request for transmission of the particular data from the inside application 105, the data dividing unit 110 divides the particular data into two or more pieces of partial data. That is, for simultaneous data transmission using a 3G network and a WiFi network, the data dividing unit 110 divides the particular data to be transmitted into two or more pieces of partial data corresponding to the number of networks. This procedure of division may be performed based on the network-specific traffic distribution rate changing according to a detected real time network state or the network selection policy transferred from the policy management device 600.

By performing the above-described procedure of data division based on the network-specific distribution rate changing according to a detected real time network state or the network selection policy, the data dividing unit 110 may apply relative distribution ratios to the 3G network and the WiFi network, for example, a relative distribution ratio of 10% to the 3G network and a relative distribution ratio of 90% to the WiFi network, a relative distribution ratio of 90% to the 3G network and a relative distribution ratio of 10% to the WiFi network, a relative distribution ratio of 50% to the 3G network and a relative distribution ratio of 50% to the WiFi network, a relative distribution ratio of 0% to the 3G network and a relative distribution ratio of 100% to the WiFi network, or a relative distribution ratio of 100% to the 3G network and a relative distribution ratio of 0% to the WiFi network.

In addition, the data dividing unit 110 inserts the possessed network access information (for example, virtual IP) into the two or more partial data packets.

For example, the data dividing unit 110 may insert network access information (for example, virtual IP) of the terminal device 100 in order to indicate that the divided two or more pieces of partial data have been divided from one piece of data provided by the particular terminal device 100 to which the data dividing unit 110 belongs, as source address information, into headers of the divided two or more pieces of partial data as described above.

The packet dividing unit 120 divides at least one data packet included in a particular piece of partial data among the two or more pieces of partial data divided by the data dividing unit 110 into two or more partial data packets.

In more detail, in a predefined particular security condition requiring the security based on one or more combinations of the kind of the data to be transmitted and the kind of the particular external device which corresponds to a device for transmitting or receiving the data to be transmitted, the data dividing unit 110 may divide at least one data packet included in a particular piece of partial data among the two or more pieces of partial data into two or more partial data packets.

In a simultaneous data transmission system based on heterogeneous network according to the present invention, since data is divided and is then transmitted through a plurality of heterogeneous networks, there is a danger that it is easy to copy or intercept data packets in a particular network vulnerable to a security problem, such as a WiFi network.

That is, the packet dividing unit 120 may predefine a situation in which the kind of the data to be transmitted corresponds to data according to an electronic transaction related data service (e.g. services of Internet banking, card payment system, security grade subscriber log-in, etc.) especially requiring the security, as a security condition. Also, the packet dividing unit 120 may predefine a situation in which the kind of the inside application 105 for transmitting or receiving the data to be transmitted corresponds to a server of a governmental organization (e.g. national assembly, national tax service, etc.) especially requiring the security, as a security condition.

When it is not in such a predefined particular security condition, the packet dividing unit 120 does not perform the packet division of the two or more pieces of partial data divided by the data dividing unit 110. Only in a security condition, the packet dividing unit 120 divides at least one data packet included in a particular piece of partial data among the two or more pieces of partial data divided by the data dividing unit 110 into two or more partial data packets.

Moreover, the packet dividing unit 120 can divide at least one data packet included in the particular piece of partial data into two or more partial data packets as described above only when respective networks for transmitting two or more pieces of partial data divided from the particular data have been selected from the two or more networks and at least one of the selected respective networks does not satisfy a predefined security criteria.

In other words, when a 3G network and an LTE network satisfying a predefined security criteria have been selected as the respective networks for transmitting two or more pieces of partial data divided from the particular data among the two or more networks, the packet dividing unit 120 does not perform the packet division of the two or more pieces of partial data divided by the data dividing unit 110. In contrast, when a WiFi network which does not satisfy a predefined security criteria has been selected from the two or more networks, the packet dividing unit 120 divides at least one data packet included in a particular piece of partial data to be transmitted to the WiFi network among the two or more pieces of partial data divided by the data dividing unit 110 into two or more partial data packets.

Now, the process of dividing a data packet will be described in more detail. It is recommendable that the packet dividing unit 120 may possess a particular packet division policy which includes one or more combinations of network-specific packet distribution rates established in advance in consideration of states of two or more used networks and types of networks to which the packet division is applied.

For example, the packet dividing unit 120 may possess a particular packet division policy which includes one or more combinations of network-specific packet distribution rates established in advance in consideration of states of two or more used networks (for example, 3G network and WiFi network) and type information on a pre-established particular network (for example, WiFi network) to which the packet division is to be applied since the network is relatively vulnerable to the security problem.

It is recommendable that this packet division policy is updated by one of a particular management device 400 and a particular policy management device 600 determining the network selection policy based on the network state information of two or more networks.

For example, it is recommendable that this packet division policy is received from the management device 400 through an interworking between the terminal device 100 and the management device 400 and is updated by the management device 400 in response to a particular event. Otherwise, it is recommendable that this packet division policy is received from the policy management device 600 determining a network selection policy based on network state information on two or more networks and is updated by the policy management device 600 in response to a particular event.

The packet dividing unit 120 already possessing the packet division policy as described above recognizes partial data corresponding to the type of the network (for example, WiFi network) to which the packet division is applied among the two or more pieces of partial data divided by the data dividing unit 110.

Further, the packet dividing unit 120 identifies a first packet distribution rate for transmission of data packets to the first network device 200 and a second packet distribution rate for transmission of data packets to the second network device 300 according to the network-specific packet distribution rates of the packet division policy, divides at least one data packet included in corresponding partial data recognized according to the WiFi network based on the identified packet distribution rates, and determines, for each data packet, a first partial data packet to be transmitted to the first network device 200 among the two or more networks and a second partial data packet to be transmitted to the second network device 300.

The data providing unit 125 provides a piece of unpacketized partial data among the two or more pieces of partial data to the multi-communication unit 130 and provides a first partial data packet corresponding to a part of the two or more partial data packets and a second partial data packet corresponding to another part of the two or more partial data packets to the multi-communication unit 130.

That is, the data providing unit 125 provides a piece of unpacketized partial data among the two or more pieces of partial data divided by the data dividing unit 110 to the first communication unit 135 so as to transmit the unpacketized partial data to at least one corresponding particular network (e.g. 3G network) among the two or more networks (e.g. 3G network, WiFi network, LTE network, WiBro network, etc.).

Accordingly, the partial data transmitted through the first communication unit 135 is provided to the first network device 200 located in the 3G network, and the first network device 200 then transmits the partial data to the terminal device 100 functioning as a receiving device.

Further, the data providing unit 125 provides a first partial data packet divided by the packet dividing unit 120 among the two or more pieces of partial data divided by the data dividing unit 110 to the first communication unit 135 so as to transmit the first partial data packet to at least one corresponding particular network (e.g. 3G network) among the two or more networks (e.g. 3G network, WiFi network, LTE network, WiBro network, etc.), and provides a second partial data packet divided by the packet dividing unit 120 among the two or more pieces of partial data divided by the data dividing unit 110 to the second communication unit 137 so as to transmit the second partial data packet to at least one corresponding particular network (e.g. WiFi network) among the two or more networks (e.g. 3G network, WiFi network, LTE network, WiBro network, etc.).

Accordingly, the first partial data packet transmitted through the first communication unit 135 is provided to the first network device 200 located in the 3G network, and the first network device 200 then transmits the first partial data packet to the terminal device 100 functioning as a receiving device. Further, the second partial data packet transmitted through the second communication unit 137 is provided to the second network device 300 located in the WiFi network, and the second network device 300 then transmits the second partial data packet to the terminal device 100 functioning as a receiving device.

As described above, the terminal device 100 performs a first division for dividing a piece of data into two or more pieces of partial data, performs a second division for dividing a piece of particular partial data to be transmitted through a network vulnerable to the security problem among the divided two or more pieces of partial data into two or more partial data packets, and then transmits the respective divided partial data packets through heterogeneous networks, so as to reinforce the security for the data to be transmitted.

Hereinafter, the configuration of the terminal device 100 as a receiving device according to the present invention will be described in consideration of a downlink procedure.

The terminal device 100 as a receiving device according to the present invention may include a packet merging unit 140 and a data merging unit 150.

When a first data packet corresponding to a part of two or more partial data packets divided from one particular data packet and a second data packet corresponding to another part thereof have been received through the multi-communication unit 130, the packet merging unit 140 merges the first data packet and the second data packet based on one or more combinations of particular network access information and packet identification information, packet identification information, and packet sequence information included the first data packet and the second data packet, so as to reconstruct the original data packet.

In more detail, during the downlink procedure, the first partial data packet forcedly divided from one data packet by the management device 400 may be transferred through a 3G network to the terminal device 100 as a receiving device, and the forcedly divided second partial data packet may be transferred through a WiFi network to the terminal device 100 as a receiving device.

In this event, the first data packet corresponding to a part of two or more partial data packets divided from one particular data packet and the second data packet corresponding to another part thereof may be received through the multi-communication unit 130.

Also, when a first data packet corresponding to a part of two or more partial data packets divided from one particular data packet and a second data packet corresponding to another part thereof have been received through the multi-communication unit 130, the packet merging unit 140 extracts and recognizes the first data packet and the second data packet having network access information (for example, a virtual IP address) allocated to the terminal device 100, based on particular network access information (for example, a virtual IP address) included in the received first and second partial data packets. This recognition corresponds to recognition of partial data packets divided from one piece of data provided to a particular transmitting device, i.e. the terminal device 100 to which the packet merging unit 140 belongs.

Further, the packet merging unit 140 extracts and recognizes the first partial data packet and the second partial data packet having the same packet identification information based on the packet identification information included in the recognized first partial data packet and second partial data packet. This recognition corresponds to recognition of partial data packets divided from one particular data packet.

Further, the packet merging unit 140 may generate the original data packet by merging the first partial data packet and the second partial data packet according to a sequence based on the packet sequence information included in the recognized first partial data packet and second partial data packet, and may reconstruct the original partial data by merging the generated data packets.

When pieces of partial data divided from one piece of particular data have been received through the multi-communication unit 130, the data merging unit 150 generates the particular data by merging the pieces of partial data based on one or more combinations of data sequence information and particular network access information included in the partial data, indicating the sequence between multiple pieces of data including at least one data packet generated by the packet merging unit 140 and the received partial data.

During the downlink procedure, a piece of unpacketized partial data divided from one piece of data by the terminal device 100 may be transferred to the terminal device 100 as a receiving device through a 3G network.

Further, a piece of partial data corresponding to a part of two or more pieces of partial data divided from one piece of particular data may be received through the multi-communication unit 130.

Then, when a piece of partial data divided from one piece of particular data has been received through the multi-communication unit 130, the data merging unit 150 extracts and recognizes partial data having network access information (for example, a virtual IP address) corresponding to a particular terminal device 100 based on particular network access information (for example, a virtual IP address) included in partial data including one or more data packet generated/reconstructed by the packet merging unit 140 and the received partial data. This recognition corresponds to recognition of pieces of partial data divided from one piece of data provided by the terminal device 100.

Further, the data merging unit 150 may generate or reconstruct the original data by merging the pieces of partial data according to the data sequence information (for example, sequence number) included in each piece of the recognized partial data, or may transfer the reconstructed data to the application 105.

As described above, in implementing a simultaneous link transmission through the plurality of heterogeneous networks for one session, a transmitting device and a receiving device according to the present invention performs a first division for dividing a piece of data into two or more pieces of partial data, performs a second division for dividing a piece of particular partial data to be transmitted through a network vulnerable to the security problem among the divided two or more pieces of partial data into two or more partial data packets, and then transmits the respective divided partial data packets through heterogeneous networks, so as to reinforce the security for the data to be transmitted, so as to effectively conceal the service and prevent other people or another party from recognizing the service through copying or intercepting of data packets, thereby strengthening the security of even the particular partial data to be transmitted through a network vulnerable to the security problem.

Figure 5:
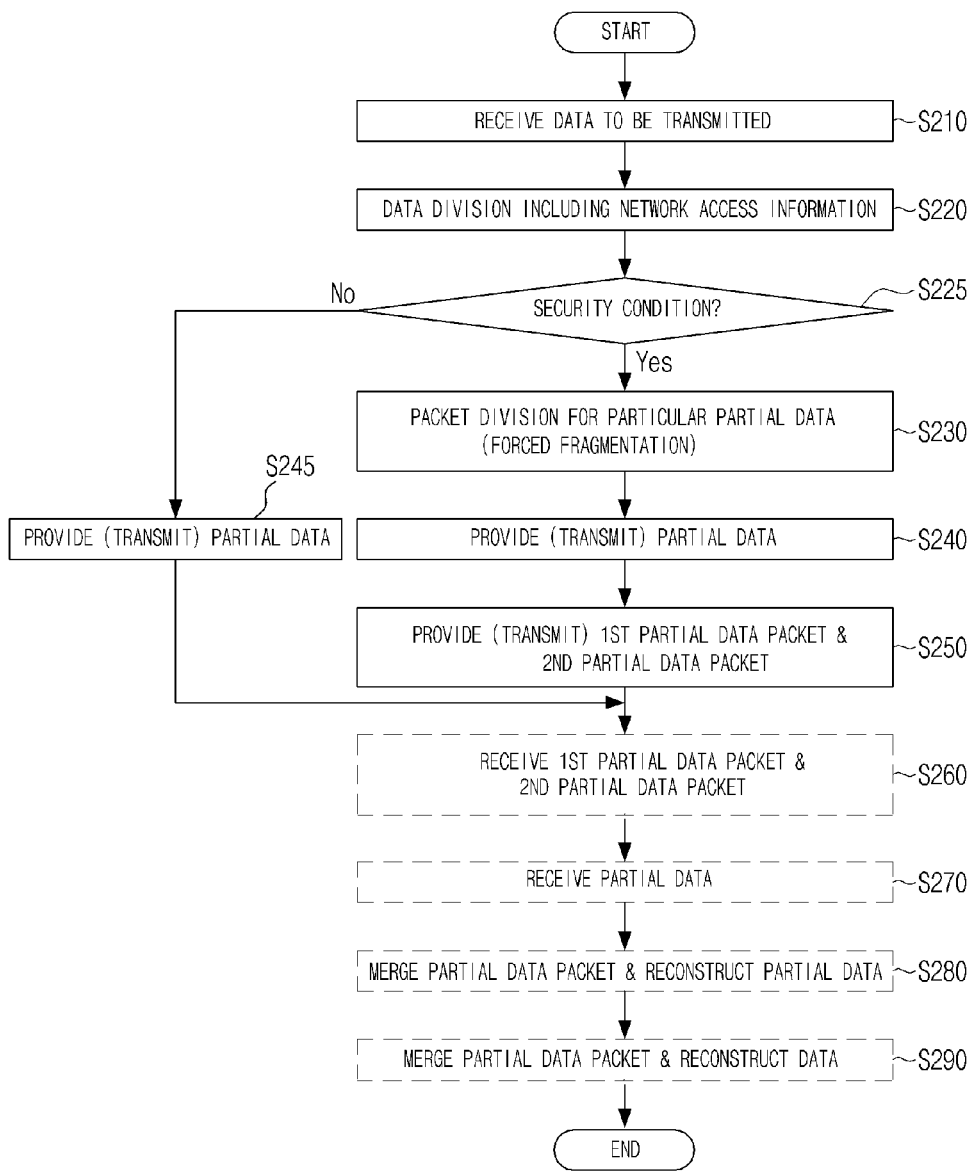
FIG. 5 is a flowchart illustrating an operation method of a management device functioning as a transmitting device or a receiving device according to an exemplary embodiment of the present invention.
Figure 6:
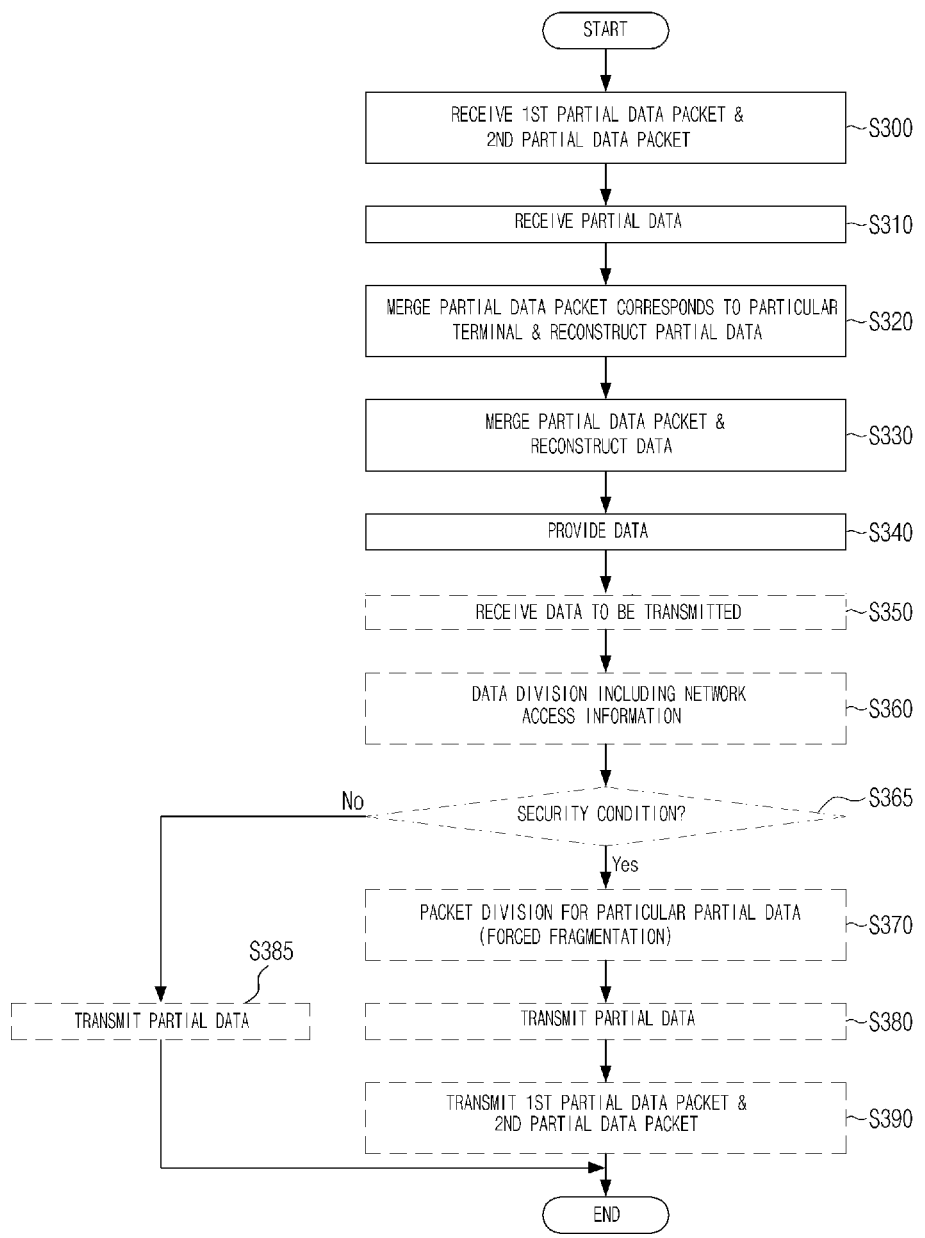
FIG. 6 is a flowchart illustrating an operation method of a terminal device functioning as a transmitting device or a receiving device according to an exemplary embodiment of the present invention.

Hereinafter, a heterogeneous network based simultaneous data transmission method according to an exemplary embodiment of the present invention will be described with reference to FIGS. 4 to 6. In the following description, the same reference numerals will be used for the elements shown in FIGS. 1 to 3 for convenience of description.

Figure 4:
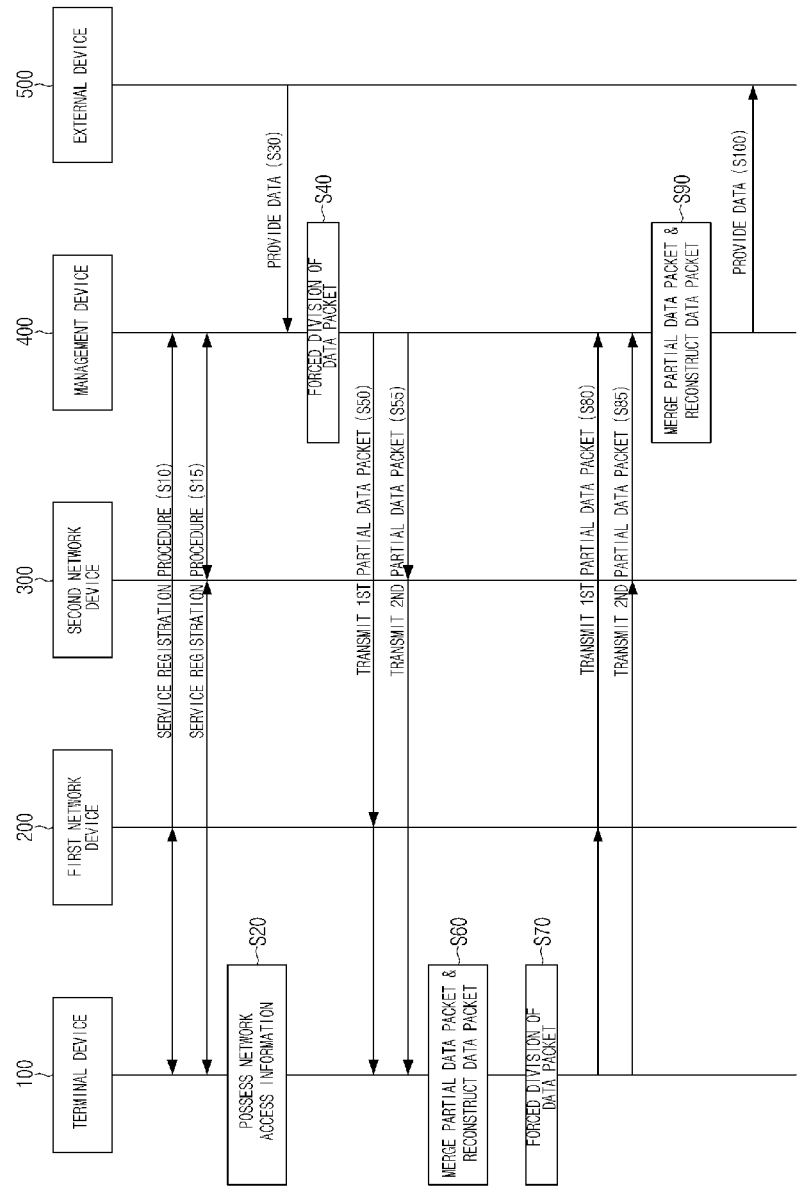
FIG. 4 is a flowchart illustrating a service flow of a heterogeneous network based simultaneous data transmission method according to an exemplary embodiment of the present invention.

First, a heterogeneous network based simultaneous data transmission method according to an exemplary embodiment of the present invention is described now with reference to FIG. 4.

The terminal device 100 accesses the management device 400 through heterogeneous networks (for example, a 3G network and a WiFi network) and makes a request for a service registration (steps S10 and S15).

Before these steps, it is required that the terminal device 100 be allocated its own first network access information (for example, a 3G IP address) for the 3G network and its own second network access information (for example, a WiFi IP address) for the WiFi network.

For example, the terminal device 100 may perform a location registration in the 3G network and then receive its own first network access information (for example, a 3G IP address) according to a conventional access information allocation scheme from the first network device 200.

Also, the terminal device 100 may perform a location registration in the WiFi network and then receive its own second network access information (for example, a WiFi IP address) according to a conventional access information allocation scheme from the second network device 300.

Thereafter, for a service registration procedure between the terminal device 100 and the management device 400, the terminal device 100 acquires access information (for example, a management device 3G IP address) of the management device 400 for accessing the 3G network, by which it is possible to access the management device 400 through the first network, i.e. 3G network, and access information (for example, a management device WiFi IP address) of the management device 400 for accessing the WiFi network, by which it is possible to access the management device 400 through the second network, i.e. WiFi network.

In this event, the terminal device 100 can acquire or identify the access information (for example, a management device 3G IP address) of the management device 400 for accessing the 3G network and the access information (for example, a management device WiFi IP address) of the management device 400 for accessing the WiFi network, through various procedures.

Further, when the procedure of acquiring the access information for the management device 400 as described above has been completed, the service registration procedure between the terminal device 100 and the management device 400 should be performed.

To this end, the terminal device 100 makes a request for service registration after accessing the management device 400 through respective networks based on the acquired access information for accessing the 3G network and access information for accessing the WiFi network.

For example, the terminal device 100 makes a request for service registration of itself by transmitting a binding update message after accessing the management device 400 through a first network, i.e. 3G network, based on the acquired access information (for example, a management device 3G IP address) of the management device 400 for accessing the 3G network. Then, the management device 400 identifies additional information included in the service registration request, such as device identification information (for example, IMSI), first network access information (for example, a 3G IP address), and network type information (for example, a 3G IP address) indicating the type of a network through which a current binding update message is updated, performs service registration for the terminal device 100, and transmits a binding update ACK message as a reply to the terminal device 100, so as complete the service registration procedure through the 3G network.

Further, the terminal device 100 makes a request for service registration of itself by transmitting a binding update message after accessing the management device 400 through a second network, i.e. WiFi network, based on the acquired access information (for example, a management device WiFi IP address) of the management device 400 for accessing the WiFi network. Then, the management device 400 identifies additional information included in the service registration request, such as device identification information (for example, IMSI), second network access information (for example, a WiFi IP address), and network type information (for example, a WiFi IP address) indicating the type of a network through which a current binding update message is updated, performs service registration for the terminal device 100, and transmits a binding update ACK message as a reply to the terminal device 100, so as complete the service registration procedure through the WiFi network.

To this end, it is required that the terminal device 100 should be allocated and possess separate network access information (for example, a virtual IP address) for a heterogeneous network based simultaneous data transmission service according to the present invention and the management device 400 should be capable of managing the separate network access information.

Therefore, the terminal device 100 may receive and possess network access information (for example, a virtual IP address) allocated by the management device 400 in the service registration procedure through the 3G network or WiFi network as described above (step S20).

First, a downlink procedure will be described hereinafter. For data to be transmitted which is requested to be transmitted from an external device 500 to the terminal device 100 (step S30), the management device 400 as a transmitting device divides at least one data packet included in the data to be transmitted into two or more partial data packets in order to use a simultaneous data transmission service.

That is to say, the management device 400 may possess a particular packet division policy for dividing a data packet and thus divide at least one data packet included in the data to be transmitted into two or more partial data packets. In other words, the management device 400 identifies a first packet distribution rate for data transmission to the first network device 200 and a second packet distribution rate for data transmission to the second network device 300 included in the packet division policy, divides at least one data packet included in the data to be transmitted based on the identified packet distribution rates, and determines a first partial data packet to be transmitted to the first network device 200 and a second partial data packet to be transmitted to the second network device 300 among the two or more networks.

Further, the management device 400 inserts network access information (for example, a virtual IP address) of the terminal device 100, which is the final destination, in each of the first partial data packet and the second partial data packet.

Thereafter, the management device 400 transmits the first partial data packet to the first network device 200 located in the 3G network, and the first network device 200 then transmits the first partial data packet to the terminal device 100 functioning as a receiving device (step S50). Further, the management device 400 transmits the second partial data packet to the second network device 300 located in the WiFi network, and the second network device 300 then transmits the second partial data packet to the terminal device 100 functioning as a receiving device (step S55).

As described above, the first partial data packet forcedly divided from one data packet by the management device 400 is transferred to the terminal device 100 functioning as a receiving device through a 3G network, and the divided second partial data packet is transferred to the terminal device 100 functioning as a receiving device through a WiFi network.

The terminal device 100 receives the first partial data packet from the first network device 200 and the second partial data packet from the second network device 300 and merges the first partial data packet and the second partial data packet according to particular network access information based on the network access information included in the received first partial data packet and second partial data packet, so as to generate the original data packet and thereby reconstruct the data to be transmitted by the management device 400.

That is, the terminal device 100 recognizes the first partial data packet and the second partial data packet having network access information (for example, a virtual IP address) allocated to itself based on network access information (for example, a virtual IP address) included in various received partial data packets, generates each data packet by merging or assembling the recognized partial data packets according to a sequence corresponding to one identical data packet based on packet identification information and packet sequence information included in the recognized partial data packets, and then merges the generated data packets to reconstruct the original data to be transmitted.

The first partial data packet and the second partial data packet divided from one data packet by the management device 400 are transmitted to the terminal device 100 through heterogeneous networks (for example, a 3G network and a WiFi network) and are then merged by the terminal device 100, so that they are reconstructed into original data packets and are then reconstructed into the data to be transmitted, which includes the reconstructed data packets.

Meanwhile, an uplink procedure will be described hereinafter. The management device 400 divides at least one data packet included in the data to be transmitted into two or more partial data packets in order to use a simultaneous data transmission service (step S70).

That is to say, the terminal device 100 may possess a particular packet division policy for dividing a data packet and thus divide at least one data packet included in the data to be transmitted into two or more partial data packets. In other words, the terminal device 100 identifies a first packet distribution rate for data transmission to the first network device 200 and a second packet distribution rate for data transmission to the second network device 300 included in the packet division policy, divides at least one data packet included in the data to be transmitted based on the identified packet distribution rates, and determines a first partial data packet to be transmitted to the first network device 200 and a second partial data packet to be transmitted to the second network device 300 among the two or more networks.

Further, the terminal device 100 inserts network access information (for example, a virtual IP address) of the management device 400 in each of the first partial data packet and the second partial data packet.

Thereafter, the terminal device 100 transmits the first partial data packet to the first network device 200 located in the 3G network, and the first network device 200 then transmits the first partial data packet to the management device 400 functioning as a receiving device (step S80). Further, the terminal device 100 transmits the second partial data packet to the second network device 300 located in the WiFi network, and the second network device 300 then transmits the second partial data packet to the management device 400 functioning as a receiving device (step S85).

As described above, the first partial data packet forcedly divided from one data packet by the terminal device 100 is transferred to the management device 400 through a 3G network, and the divided second partial data packet is transferred to the management device 400 through a WiFi network.

The management device 400 receives the first partial data packet from the first network device 200 and the second partial data packet from the second network device 300 and merges the first partial data packet and the second partial data packet according to particular network access information based on the network access information included in the received first partial data packet and second partial data packet, so as to generate the original data packet and thereby reconstruct the data to be transmitted by the management device 400 (step S90).

That is, the management device 400 recognizes the first partial data packet and the second partial data packet having network access information (for example, a virtual IP address) allocated to itself based on network access information (for example, a virtual IP address) included in various received partial data packets, generates each data packet by merging or assembling the recognized partial data packets according to a sequence corresponding to one identical data packet based on packet identification information and packet sequence information included in the recognized partial data packets, and then merges the generated data packets to reconstruct the original data to be transmitted.

Further, the management device 400 transmits the reconstructed data to the external device 500, which corresponds to the final destination, by using access information of the external device 500 recognized from at least one partial data packet among the first partial data packet and the second partial data packet.

The first partial data packet and the second partial data packet divided from one data packet by the terminal device 100 as described above are merged by the management device 400 in the procedure in which they are transmitted to the management device 400 through heterogeneous networks (for example, a 3G network and a WiFi network), so that they are reconstructed into original data packets and are then reconstructed into the data to be transmitted, which includes the reconstructed data packets. Then, the reconstructed data is transmitted as one piece of data to the external device 500, which corresponds to the final destination.

In the present invention, since the terminal device 100 or the management device 400 as a transmitting device forcedly divides each data packet into two or more partial data packets and then simultaneously transmits the divided two or more partial data packets through different networks, other people or another party is unable to identify a used service related to a partial data packet transmitted through a particular network even when the partial data packet is copied or intercepted.

Hereinafter, an operation method of a transmitting device according to an embodiment of the present invention will be described in more detail with reference to FIG. 5 based on the terminal device 100 operating as a transmitting device.

First, an operation method of a transmitting device according to an embodiment of the present invention will be described based on an uplink procedure. The transmitting device may receive particular data to be transmitted, together with a request for transmission of the particular data, from a particular application using a data service executed within the transmitting device (step S210). Then, the transmitting device divides the particular data into two or more pieces of partial data and inserts particular network access information into the two or more pieces of partial data (step S220).

For example, in the operation method of the transmitting device according to the present invention, the transmitting device may be allocated and possess separate network access information (for example, a virtual IP address) for a heterogeneous network based simultaneous data transmission service according to the present invention.

Also, in the operation method of the transmitting device according to the present invention, when the transmitting device has received a request for transmission of particular data by receiving the particular data from the inside application 105, the transmitting device divides the particular data into two or more pieces of partial data.

That is, for simultaneous data transmission using a 3G network and a WiFi network, the operation method of the transmitting device according to the present invention includes a step of dividing the particular data to be transmitted into two or more pieces of partial data corresponding to the number of networks. This division step may be performed based on the network-specific traffic distribution rate changing according to a detected real time network state or the network selection policy transferred from the policy management device 600.

By performing the above-described data division step based on the network-specific distribution rate changing according to a detected real time network state or the network selection policy, the operation method of the transmitting device according to the present invention may apply relative distribution ratios to the 3G network and the WiFi network, for example, a relative distribution ratio of 10% to the 3G network and a relative distribution ratio of 90% to the WiFi network, a relative distribution ratio of 90% to the 3G network and a relative distribution ratio of 10% to the WiFi network, a relative distribution ratio of 50% to the 3G network and a relative distribution ratio of 50% to the WiFi network, a relative distribution ratio of 0% to the 3G network and a relative distribution ratio of 100% to the WiFi network, or a relative distribution ratio of 100% to the 3G network and a relative distribution ratio of 0% to the WiFi network.

In addition, the operation method of the transmitting device according to the present invention inserts network access information (for example, virtual IP) of the terminal device 100 recognized based on the possessed subscriber-specific table information, into the two or more partial data packets.

For example, the operation method of the transmitting device according to the present invention may insert network access information (for example, virtual IP) of the terminal device 100 in order to indicate that the divided two or more pieces of partial data have been divided from one piece of data provided to the particular terminal device 100, as source address information, into headers of the divided two or more pieces of partial data as described above.

Further, the operation method of the transmitting device according to the present invention divides at least one data packet included in a particular piece of partial data among the two or more pieces of partial data divided by the data dividing unit 410 into two or more partial data packets (step S230).

In more detail, in a predefined particular security condition requiring the security based on one or more combinations of the kind of the data to be transmitted and the kind of the particular external device which corresponds to a device for transmitting or receiving the data to be transmitted (step S225), the operation method of the transmitting device according to the present invention may divide at least one data packet included in a particular piece of partial data among the two or more pieces of partial data into two or more partial data packets.

That is, the operation method of the transmitting device according to the present invention may predefine a situation in which the kind of the data to be transmitted corresponds to data according to an electronic transaction related data service (e.g. services of Internet banking, card payment system, security grade subscriber log-in, etc.) especially requiring the security, as a security condition. Also, the operation method of the transmitting device according to the present invention may predefine a situation in which the kind of the external device 500 for transmitting or receiving the data to be transmitted corresponds to a server of a governmental organization (e.g. national assembly, national tax service, etc.) especially requiring the security, as a security condition.

When it is not in such a predefined particular security condition, the operation method of the transmitting device according to the present invention does not perform a packet division of the two or more pieces of partial data divided in step S220, and may instead provide the pieces of partial data for transmission of them through pertinent networks (for example, a 3G network and a WiFi network), respectively (step S245).

In contrast, in a security condition, the operation method of the transmitting device according to the present invention divides at least one data packet included in a particular piece of partial data among the two or more pieces of partial data divided in step S220 into two or more partial data packets (step S230).

Moreover, the operation method of the transmitting device according to the present invention can divide at least one data packet included in the particular piece of partial data into two or more partial data packets as described above only when respective networks for transmitting two or more pieces of partial data divided from the particular data have been selected from the two or more networks and at least one of the selected respective networks does not satisfy a predefined security criteria.

In other words, when a 3G network and an LTE network satisfying a predefined security criteria have been selected as the respective networks for transmitting two or more pieces of partial data divided from the particular data among the two or more networks, the operation method of the transmitting device according to the present invention does not perform the packet division of the two or more pieces of partial data divided by the data dividing unit 410. In contrast, when a WiFi network which does not satisfy a predefined security criteria has been selected from the two or more networks, the operation method of the transmitting device according to the present invention divides at least one data packet included in a particular piece of partial data to be transmitted to the WiFi network among the two or more pieces of partial data divided by the data dividing unit 410 into two or more partial data packets.

In the operation method of the transmitting device according to the present invention, it is recommendable to possess a particular packet division policy which includes one or more combinations of network-specific packet distribution rates established in advance in consideration of states of two or more used networks and types of networks to which the packet division is applied.

For example, in the operation method of the transmitting device according to the present invention, it is possible to possess a particular packet division policy which includes one or more combinations of network-specific packet distribution rates established in advance in consideration of states of two or more used networks (for example, 3G network and WiFi network) and type information on a pre-established particular network (for example, WiFi network) to which the packet division is to be applied since the network is relatively vulnerable to the security problem.

It is recommendable that this packet division policy is updated by the policy management device 600 determining the network selection policy based on the network state information of two or more networks. For example, it is recommendable that this packet division policy is received from the management device 400 through an interworking between the terminal device 100 and the management device 400 and is updated by the management device 400 in response to a particular event. Otherwise, it is recommendable that this packet division policy is received from the policy management device 600 determining a network selection policy based on network state information on two or more networks and is updated by the policy management device 600 in response to a particular event.

The operation method of the transmitting device according to the present invention, in which it is possible to possess the packet division policy as described above, recognizes partial data corresponding to the type of the network (for example, WiFi network) to which the packet division is applied among the two or more pieces of partial data divided in step S220.

Further, the operation method of the transmitting device according to the present invention may include the steps of: identifying a first packet distribution rate for transmission of data packets to the first network device 200 and a second packet distribution rate for transmission of data packets to the second network device 300 according to the network-specific packet distribution rates of the packet division policy; dividing at least one data packet included in corresponding partial data recognized according to the WiFi network based on the identified packet distribution rates; and determining, for each data packet, a first partial data packet to be transmitted to the first network device 200 among the two or more networks and a second partial data packet to be transmitted to the second network device 300.

The operation method of the transmitting device according to the present invention may also include the steps of: providing a piece of unpacketized partial data among the two or more pieces of partial data to the multi-communication unit 130; and providing a first partial data packet corresponding to a part of the two or more partial data packets and a second partial data packet corresponding to another part of the two or more partial data packets to the multi-communication unit 130.

That is, the operation method of the transmitting device according to the present invention provides a piece of unpacketized partial data among the two or more pieces of partial data divided by the data dividing unit 110 to the first communication unit 135 so as to transmit the unpacketized partial data to at least one corresponding particular network (e.g. 3G network) among the two or more networks (e.g. 3G network, WiFi network, LTE network, WiBro network, etc.) (step S240). Then, the partial data transmitted through the first communication unit 135 is provided to the first network device 200 located in the 3G network, and the first network device 200 then transmits the partial data to the terminal device 100 functioning as a receiving device.

Further, the operation method of the transmitting device according to the present invention provides a first partial data packet divided by the packet dividing unit 120 among the two or more pieces of partial data divided by the data dividing unit 110 to the first communication unit 135 so as to transmit the first partial data packet to at least one corresponding particular network (e.g. 3G network) among the two or more networks (e.g. 3G network, WiFi network, LTE network, WiBro network, etc.), and provides a second partial data packet divided by the packet dividing unit 120 among the two or more pieces of partial data divided by the data dividing unit 110 to the second communication unit 137 so as to transmit the second partial data packet to at least one corresponding particular network (e.g. WiFi network) among the two or more networks (e.g. 3G network, WiFi network, LTE network, WiBro network, etc.) (step S250). Then, the first partial data packet transmitted through the first communication unit 135 is provided to the first network device 200 located in the 3G network, and the first network device 200 then transmits the first partial data packet to the terminal device 100 functioning as a receiving device. Further, the second partial data packet transmitted through the second communication unit 137 is provided to the second network device 300 located in the WiFi network, and the second network device 300 then transmits the second partial data packet to the terminal device 100 functioning as a receiving device.

As described above, the operation method of the transmitting device according to the present invention includes the steps of: performing a first division for dividing a piece of data into two or more pieces of partial data; performing a second division for dividing a piece of particular partial data to be transmitted through a network vulnerable to the security problem among the divided two or more pieces of partial data into two or more partial data packets; and then transmitting the respective divided partial data packets through heterogeneous networks, so as to reinforce the security for the data to be transmitted.

Hereinafter, an operation method of a receiving device according to an embodiment of the present invention will be described based on the terminal device 100 operating as a receiving device.

As in the downlink procedure described above, the first partial data packet forcedly divided from one data packet by the management device 400 may be transferred through a 3G network to the terminal device 100 as a receiving device, and the forcedly divided second partial data packet may be transferred through a WiFi network to the terminal device 100 as a receiving device.

As a result, in the operation method of the receiving device according to the present invention, the first data packet corresponding to a part of two or more partial data packets divided from one particular data packet and the second data packet corresponding to another part thereof may be received (step S260).

Further, in the downlink procedure, a piece of unpacketized partial data divided from one piece of data by the management device 400 may be transferred to the terminal device 100 as a receiving device through a particular network (for example, a 3G network).

Therefore, in the operation method of the receiving device according to the present invention, a piece of partial data corresponding to a part of two or more pieces of partial data divided from one piece of particular data may be received (step S270).

In the operation method of the receiving device according to the present invention, when a first data packet corresponding to a part of two or more partial data packets divided from one particular data packet and a second data packet corresponding to another part thereof have been received (step S260), the first data packet and the second data packet are merged with each other based on one or more combinations of particular network access information and packet identification information, packet identification information, and packet sequence information included the first data packet and the second data packet, so as to reconstruct the original data packet (step S280).

That is, in the operation method of the receiving device according to the present invention, the first data packet and the second data packet having network access information (for example, a virtual IP address) allocated to the terminal device 100 are extracted and recognized based on particular network access information (for example, a virtual IP address) included in the received first and second partial data packets. This recognition corresponds to recognition of partial data packets divided from one piece of data provided to a particular transmitting device, i.e. the terminal device 100.

Further, in the operation method of the receiving device according to the present invention, the first partial data packet and the second partial data packet having the same packet identification information are extracted and recognized based on the packet identification information included in the recognized first partial data packet and second partial data packet. This recognition corresponds to recognition of partial data packets divided from one particular data packet.

Further, the operation method of the receiving device according to the present invention may generate the original data packet by merging the first partial data packet and the second partial data packet according to a sequence based on the packet sequence information included in the recognized first partial data packet and second partial data packet, and may reconstruct the original partial data by merging the generated data packets.

Also, in the operation method of the receiving device according to the present invention, the particular data may be generated by merging the pieces of partial data based on one or more combinations of data sequence information and particular network access information included in the partial data received in step S270 and at least one data packet generated in step S280 (step S290).

That is, in the operation method of the receiving device according to the present invention, partial data having network access information (for example, a virtual IP address)

allocated to the receiving device itself are extracted and recognized based on particular network access information (for example, a virtual IP address) included in partial data including one or more data packet generated/reconstructed in step S280 and the received partial data. This recognition corresponds to recognition of pieces of partial data divided from one piece of data provided by the terminal device 100.

Further, in the operation method of the receiving device according to the present invention, the original data may be generated or reconstructed by merging the pieces of partial data according to the data sequence information (for example, sequence number) included in each piece of the recognized partial data, and the reconstructed data may be transferred to the application 105.

Hereinafter, an operation method of a receiving device according to an embodiment of the present invention will be described with reference to FIG. 6 based on the management device 400 operating as a receiving device.

First, the description will be given based on an uplink procedure. In an operation method of a receiving device according to the present invention, the first partial data packet forcedly divided from one data packet by the terminal device 100 may be transferred through a 3G network to the management device 400 as a receiving device, and the forcedly divided second partial data packet may be transferred through a WiFi network to the management device 400 as a receiving device.

As a result, in the operation method of the receiving device according to the present invention, the first data packet corresponding to a part of two or more partial data packets divided from one particular data packet and the second data packet corresponding to another part thereof may be received (step S300).

Further, in the uplink procedure, a piece of unpacketized partial data divided from one piece of data by the terminal device 100 may be transferred to the management device 400 as a receiving device through 3G network.

Therefore, in the operation method of the receiving device according to the present invention, a piece of partial data corresponding to a part of two or more pieces of partial data divided from one piece of particular data may be received (step S310).

In the operation method of the receiving device according to the present invention, when a first data packet corresponding to a part of two or more partial data packets divided from one particular data packet and a second data packet corresponding to another part thereof have been received (step S300), the first data packet and the second data packet are merged with each other based on one or more combinations of particular network access information and packet identification information, packet identification information, and packet sequence information included the first data packet and the second data packet, so as to reconstruct the original data packet (step S320).

That is, when a first data packet corresponding to a part of two or more partial data packets divided from one particular data packet and a second data packet corresponding to another part thereof have been received, the first data packet and the second data packet as packets having been provided by one particular terminal device 100 may be recognized based on the subscriber-specific table information including network access information (for example, a virtual IP address) of a device having a registered service for each subscriber.

In other words, in the operation method of the receiving device according to the present invention, based on the subscriber-specific table information including network access information (for example, a virtual IP address) of a device having a registered service for each subscriber and based on the network access information (for example, a virtual IP address) included in the first partial data packet and the second partial data packet, the first partial data packet and the second partial data packet according to particular network access information (for example, a virtual IP address) corresponding to another particular transmitting device, i.e. the terminal device 100 are extracted and recognized. This recognition corresponds to recognition of partial data packets divided from one piece of data provided by the terminal device 100.

Further, in the operation method of the receiving device according to the present invention, the first partial data packet and the second partial data packet having the same packet identification information are extracted and recognized based on the packet identification information included in the recognized first partial data packet and second partial data packet. This recognition corresponds to recognition of partial data packets divided from one particular data packet.

Further, the operation method of the receiving device according to the present invention may generate the original data packet by merging the first partial data packet and the second partial data packet according to a sequence based on the packet sequence information included in the recognized first partial data packet and second partial data packet, and may reconstruct the original partial data by merging the generated data packets.

Also, in the operation method of the receiving device according to the present invention, the particular data may be generated by merging the pieces of partial data based on one or more combinations of data sequence information and particular network access information included in the partial data received in step S310 and at least one data packet generated in step S320 (step S330).

That is, in the operation method of the receiving device according to the present invention, partial data having network access information (for example, a virtual IP address) corresponding to the terminal device 100 are extracted and recognized based on particular network access information (for example, a virtual IP address) included in partial data including one or more data packet generated/reconstructed in step S320 and the received partial data. This recognition corresponds to recognition of pieces of partial data divided from one piece of data provided by the terminal device 100.

Further, in the operation method of the receiving device according to the present invention, the original data may be generated or reconstructed by merging the pieces of partial data according to the data sequence information (for example, sequence number) included in each piece of the recognized partial data, and the reconstructed data may be transferred to a corresponding external device 500.

Hereinafter, an operation method of a transmitting device according to an embodiment of the present invention will be described based on the management device 400 operating as a transmitting device.

First, in an operation method of a transmitting device according to an embodiment of the present invention which is described below based on a downlink procedure, the transmitting device divides particular data to be transmitted into two or more pieces of partial data.

In more detail, in an operation method of a transmitting device according to an embodiment of the present invention, the transmitting device may receive the particular data, together with a request for transmission of the particular data, from a particular external device 500 providing a data service through data transmission and reception with the terminal device 100 (step S350). Then, the transmitting device divides the particular data into two or more pieces of partial data and inserts particular network access information corresponding to the terminal device 100 into the two or more pieces of partial data (step S360).

For example, in the operation method of the transmitting device according to the present invention, the transmitting device may possess subscriber-specific table information including network access information (for example, a virtual IP address) of a device having a registered service for each subscriber as described above for a heterogeneous network based simultaneous data transmission service according to the present invention.

Also, in the operation method of the transmitting device according to the present invention, when the transmitting device has received a request for transmission of particular data to the terminal device 100 by receiving the particular data from the external device 500, the transmitting device divides the particular data into two or more pieces of partial data. That is, for simultaneous data transmission using a 3G network and a WiFi network, the operation method of the transmitting device according to the present invention includes a step of dividing the particular data to be transmitted into two or more pieces of partial data corresponding to the number of networks. This division step may be performed based on the network-specific traffic distribution rate changing according to a detected real time network state or the network selection policy transferred from the policy management device 600.

By performing the above-described data division step based on the network-specific distribution rate changing according to a detected real time network state or the network selection policy, the operation method of the transmitting device according to the present invention may apply relative distribution ratios to the 3G network and the WiFi network, for example, a relative distribution ratio of 10% to the 3G network and a relative distribution ratio of 90% to the WiFi network, a relative distribution ratio of 90% to the 3G network and a relative distribution ratio of 10% to the WiFi network, a relative distribution ratio of 50% to the 3G network and a relative distribution ratio of 50% to the WiFi network, a relative distribution ratio of 0% to the 3G network and a relative distribution ratio of 100% to the WiFi network, or a relative distribution ratio of 100% to the 3G network and a relative distribution ratio of 0% to the WiFi network.

In addition, the operation method of the transmitting device according to the present invention inserts network access information (for example, virtual IP) of the management device 400 recognized based on the possessed subscriber-specific table information, into the two or more partial data packets.

For example, the operation method of the transmitting device according to the present invention may insert network access information (for example, virtual IP) of the management device 400 in order to indicate that the divided two or more pieces of partial data have been divided from one piece of data provided to the particular terminal device 100, as source address information, into headers of the divided two or more pieces of partial data as described above.

Further, the operation method of the transmitting device according to the present invention divides at least one data packet included in a particular piece of partial data among the two or more pieces of partial data divided by the data dividing unit 410 into two or more partial data packets (step S370).

In more detail, in a predefined particular security condition requiring the security based on one or more combinations of the kind of the data to be transmitted and the kind of the particular external device which corresponds to a device for transmitting or receiving the data to be transmitted (step S365), the operation method of the transmitting device according to the present invention may divide at least one data packet included in a particular piece of partial data among the two or more pieces of partial data into two or more partial data packets.

That is, the operation method of the transmitting device according to the present invention may predefine a situation in which the kind of the data to be transmitted corresponds to data according to an electronic transaction related data service (e.g. services of Internet banking, card payment system, security grade subscriber log-in, etc.) especially requiring the security, as a security condition. Also, the operation method of the transmitting device according to the present invention may predefine a situation in which the kind of the external device 500 for transmitting or receiving the data to be transmitted corresponds to a server of a governmental organization (e.g. national assembly, national tax service, etc.) especially requiring the security, as a security condition.

When it is not in such a predefined particular security condition, the operation method of the transmitting device according to the present invention does not perform a packet division of the two or more pieces of partial data divided in step S220, and may instead provide the pieces of partial data for transmission of them through pertinent networks (for example, a 3G network and a WiFi network), respectively (step S385).

In contrast, in a security condition as described above, the operation method of the transmitting device according to the present invention divides at least one data packet included in a particular piece of partial data among the two or more pieces of partial data divided in step S360 into two or more partial data packets (step S370).

Moreover, the operation method of the transmitting device according to the present invention can divide at least one data packet included in the particular piece of partial data into two or more partial data packets as described above only when respective networks for transmitting two or more pieces of partial data divided from the particular data have been selected from the two or more networks and at least one of the selected respective networks does not satisfy a predefined security criteria.

In other words, when a 3G network and an LTE network satisfying a predefined security criteria have been selected as the respective networks for transmitting two or more pieces of partial data divided from the particular data among the two or more networks, the operation method of the transmitting device according to the present invention does not perform the packet division of the two or more pieces of partial data divided by the data dividing unit 410. In contrast, when a WiFi network which does not satisfy a predefined security criteria has been selected from the two or more networks, the operation method of the transmitting device according to the present invention divides at least one data packet included in a particular piece of partial data to be transmitted to the WiFi network among the two or more pieces of partial data divided by the data dividing unit 410 into two or more partial data packets.

In the operation method of the transmitting device according to the present invention, it is recommendable to possess a particular packet division policy which includes one or more combinations of network-specific packet distribution rates established in advance in consideration of states of two or more used networks and types of networks to which the packet division is applied.

For example, in the operation method of the transmitting device according to the present invention, it is possible to possess a particular packet division policy which includes one or more combinations of network-specific packet distribution rates established in advance in consideration of states of two or more used networks (for example, 3G network and WiFi network) and type information on a pre-established particular network (for example, WiFi network) to which the packet division is to be applied since the network is relatively vulnerable to the security problem.

It is recommendable that this packet division policy is updated by the policy management device 600 determining the network selection policy based on the network state information of two or more networks.

The operation method of the transmitting device according to the present invention, in which it is possible to possess the packet division policy as described above, recognizes partial data corresponding to the type of the network (for example, WiFi network) to which the packet division is applied among the two or more pieces of partial data divided in step S360.

Further, the operation method of the transmitting device according to the present invention may include the steps of: identifying a first packet distribution rate for transmission of data packets to the first network device 200 and a second packet distribution rate for transmission of data packets to the second network device 300 according to the network-specific packet distribution rates of the packet division policy; dividing at least one data packet included in corresponding partial data recognized according to the WiFi network based on the identified packet distribution rates; and determining, for each data packet, a first partial data packet to be transmitted to the first network device 200 among the two or more networks and a second partial data packet to be transmitted to the second network device 300.

The operation method of the transmitting device according to the present invention may also include the steps of: providing a piece of unpacketized partial data among the two or more pieces of partial data to the multi-communication unit 430; and providing a first partial data packet corresponding to a part of the two or more partial data packets and a second partial data packet corresponding to another part of the two or more partial data packets to the multi-communication unit 430.

That is, the operation method of the transmitting device according to the present invention provides a piece of unpacketized partial data among the two or more pieces of partial data divided by the data dividing unit 110 to the first communication unit 435 so as to transmit the unpacketized partial data to at least one corresponding particular network (e.g. 3G network) among the two or more networks (e.g. 3G network, WiFi network, LTE network, WiBro network, etc.) (step S380). Then, the partial data transmitted through the first communication unit 435 is provided to the first network device 200 located in the 3G network, and the first network device 200 then transmits the partial data to the terminal device 100 functioning as a receiving device.

Further, the operation method of the transmitting device according to the present invention provides a first partial data packet divided by the packet dividing unit 120 among the two or more pieces of partial data divided by the packet dividing unit 420 to the first communication unit 435 so as to transmit the first partial data packet to at least one corresponding particular network (e.g. 3G network) among the two or more networks (e.g. 3G network, WiFi network, LTE network, WiBro network, etc.), and provides a second partial data packet divided by the packet dividing unit 120 among the two or more pieces of partial data divided by the data dividing unit 110 to the second communication unit 437 so as to transmit the second partial data packet to at least one corresponding particular network (e.g. WiFi network) among the two or more networks (e.g. 3G network, WiFi network, LTE network, WiBro network, etc.) (step S390).

Then, the first partial data packet transmitted through the first communication unit 435 is provided to the first network device 200 located in the 3G network, and the first network device 200 then transmits the first partial data packet to the terminal device 100 functioning as a receiving device. Further, the second partial data packet transmitted through the second communication unit 437 is provided to the second network device 300 located in the WiFi network, and the second network device 300 then transmits the second partial data packet to the management device 400 functioning as a receiving device.

As described above, in a transmitting device, a receiving device, and an operation method thereof according to the present invention, in relation to a simultaneous link transmission of divided data through a plurality of heterogeneous networks for one session, particular partial data to be transmitted or received through a network vulnerable to a security problem among divided partial data is forcedly divided and is then transmitted through two or more networks or a partial data packet included in particular partial data is forcedly re-divided and is then transmitted through two or more networks, so as to effectively conceal the service and thereby prevent other people or another party from recognizing the service through copying or intercepting of data packets.

Meanwhile, the steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of storage medium (e.g. a computer-readable storage medium) known in the art. A sample storage medium may be coupled to a machine such as, for example, a computer/processor (which may be referred to herein, for convenience, as a "processor") such that the processor can read information (e.g., software commands) from and write information to the storage medium. A sample storage medium may be integral to the processor. The processor and the storage medium may reside in an ASIC. The ASIC may reside in user equipment. In the alternative, the processor and the storage medium may reside as discrete components in user equipment.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Industrial Applicability

By a transmitting device, a receiving device, and an operation method thereof according to the present invention, it is possible to divide data and transmit or receive the divided data through a plurality of heterogeneous networks for a data communication with a particular external device. Especially, according to the present invention, it is possible to forcedly divide particular partial data to be transmitted or received through a network vulnerable to a security problem among the divided partial data into partial data packets, and then transmit the divided particular partial data packets through heterogeneous networks, so as to effectively conceal the service related to the partial data packets and thereby prevent other people or another party from recognizing the service through copying or intercepting of data packets. Therefore, the present invention has overcome and exceeded the limit of the conventional technology and thus has a sufficient marketability or possibility of sale of not only the pertinent technology but also applied products. Moreover, the present invention has been disclosed clearly enough to carry out the present invention by one skilled in the art. Therefore, the present invention has an industrial applicability.

What is claimed is:

1. A transmitting device, comprising:
 a data dividing unit configured to
  predefine a security condition in which data to be transmitted over a plurality of types of networks are forcedly divided to reinforce security of the data;
  firstly divide the data into two or more partial data,
  secondly divide at least one data packet included in the firstly divided two or more partial data into two or more partial data packets when the firstly divided two or more partial data or a receiving device corresponds to the predefined security condition,
  determine a first network and a second network to transmit the secondly divided two or more partial data packets, and
  insert network access information into the secondly divided two or more partial data packets based on the determined first network and second network;
 a data providing unit configured to provide (i) a first partial data packet corresponding to one part of the two or more partial data packets and (ii) a second partial data packet corresponding to another part of the two or more partial data packets through a multi-communication unit; and
 the multi-communication unit supporting the plurality of types of networks and configured to simultaneously transmit the first partial data packet and the second partial data packet to the receiving device respectively through the first network and the second network which are different types of networks established in a single session.

2. The transmitting device as claimed in claim 1, wherein the data dividing unit is further configured to firstly divide the data based on a network-specific distribution rate changing according to a detected real time network state or a network selection policy.

3. The transmitting device as claimed in claim 1, wherein the data dividing unit is further configured to secondly divide the at least one data packet into the first partial data packet to be transmitted through a 3G network and the second partial data packet to be transmitted through a WiFi network. data packet to be transmitted through a WiFi network.

4. A transmitting device, comprising:
 a data dividing unit configured to
  firstly divide data into two or more partial data,
  determine a first network and a second network to transmit the divided two or more partial data, and
  insert network access information into the divided two or more partial data based on the determined first network and second network;
 a packet dividing unit configured to
  predefine a security condition in which the firstly divided two or more partial data are forcedly divided to reinforce security of the data;
  secondly divide at least one data packet included in the firstly divided two or more partial data into two or more partial data packets when the firstly divided two or more partial data or a receiving device corresponds to the predefined security condition;
 a data providing unit configured to provide (i) a first partial data packet corresponding to one part of the secondly divided two or more partial data packets and (ii) a second partial data packet corresponding to another part of the secondly divided two or more partial data packets through a multi-communication unit; and
 the multi-communication unit supporting a plurality of types of networks and configured to simultaneously transmit the first partial data packet and the second partial data packet to the receiving device respectively through the first network and the second network which are different types of networks established in a single session.

5. The transmitting device as claimed in claim 4, wherein the packet dividing unit is further configured to secondly divide the at least one data packet based on a network-specific distribution rate changing according to a detected real time network state or a network selection policy.

6. The transmitting device as claimed in claim 4, wherein the packet dividing unit is further configured to secondly divide the at least one data packet into the first partial data packet to be transmitted through a 3G network and the second partial data packet to be transmitted through a WiFi network.

7. A receiving device, comprising:
 a multi-communication unit supporting a plurality of kinds of networks and configured to receive, from a transmitting device, two or more partial data packets which are simultaneously transmitted through different kinds of networks established in a single session, wherein the two or more partial data packets are generated by
  firstly dividing data to be transmitted into partial data, and
  secondly dividing at least one data packet among one or more data packets included in the partial data to reinforce security of the data when the partial data correspond to a predefined security condition; and
 a packet merging unit configured to merge (i) a first partial data packet corresponding to one part of the two or more partial data packets and (ii) a second partial data packet corresponding to another part of the two or more partial data packets, based on network access information inserted into the two or more partial data packets.

8. The receiving device as claimed in claim 7, wherein the packet merging unit is configured to merge the first partial data packet and the second partial data packet based on at least one of the network access information, packet identification information, and packet sequence information included in each of the first partial data packet or the second partial data packet.

9. The receiving device as claimed in claim 8, wherein the packet merging unit is configured to
 extract the first partial data packet and the second partial data packet including the network access information of the transmitting device, and
 merge the first partial data packet and the second partial data packet based on at least one of the packet identification information and the packet sequence information included in the extracted first partial data packet and the extracted second partial data packet.

10. The receiving device as claimed in claim 9, wherein the packet merging unit is configured to extract the network access information from headers of the first partial data packet and the second partial data packet.

11. An operation method of a transmitting device, the operation method comprising:

firstly dividing data into two or more partial data;

determining a first network and a second network to transmit the divided two or more partial data;

inserting network access information into the divided two or more partial data based on the determined first network and second network;

predefining a security condition in which the firstly divided two or more partial data are forcedly divided to reinforce security of the data;

secondly dividing at least one data packet included in the firstly divided two or more partial data into two or more partial data packets when the firstly divided two or more partial data or a receiving device corresponds to the predefined security condition; and simultaneously transmitting a first partial data packet corresponding to one part of the two or more partial data packets and a second partial data packet corresponding to another part of the two or more partial data packets to the receiving device respectively through the first network and the second network which are different types of networks established in a single session.

12. The operation method as claimed in claim 11, wherein the secondly dividing comprises secondly dividing the at least one data packet based on a network-specific distribution rate changing according to a detected real time network state or a network selection policy.

13. The operation method as claimed in claim 11, wherein the secondly dividing comprises secondly dividing the at least one data packet into the first partial data packet to be transmitted through a 3G network and the second partial data packet to be transmitted through a WiFi network.

14. An operation method of a receiving device, the operation method comprising:

receiving, from a transmitting device, two or more partial data packets which are simultaneously transmitted through different kinds of networks established in a single session, wherein the two or more partial data packets are generated by firstly dividing data to be transmitted into partial data, and secondly dividing at least one data packet among one or more data packets included in the partial data to reinforce security of the data when the partial data correspond to a predefined security condition;

identifying a first partial data packet corresponding to one part of the two or more partial data packets and a second partial data packet corresponding to another part of the two or more partial data packets;

generating the at least one data packet by merging the first partial data packet and the second partial data packet, based on network access information inserted into the two or more partial data packets; and generating the partial data by using the generated at least one data packet.

15. The operation method as claimed in claim 14, wherein the generating the at least one data packet comprises:

extracting the network access information from headers of the first partial data packet and the second partial data packet; and generating the at least one data packet by merging the first partial data packet and the second partial data packet based on the extracted network access information.

* * * * *